(12) United States Patent
Chapman et al.

(10) Patent No.: US 9,225,256 B2
(45) Date of Patent: *Dec. 29, 2015

(54) APPARATUS AND METHOD FOR CONTROLLING DC-AC POWER CONVERSION

(71) Applicant: SunPower Corporation, San Jose, CA (US)

(72) Inventors: Patrick L. Chapman, Austin, TX (US); Brian T. Kuhn, Austin, TX (US); Robert S. Balog, College Station, TX (US); Jonathan W. Kimball, Rolla, MO (US); Philip T. Krein, Champaign, IL (US); Alexander Gray, Champaign, IL (US); Trishan Esram, Kennewick, WA (US)

(73) Assignee: SUNPOWER CORPORATION, San Jose, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 13/936,744

(22) Filed: Jul. 8, 2013

(65) Prior Publication Data

US 2014/0003100 A1    Jan. 2, 2014

Related U.S. Application Data

(63) Continuation of application No. 12/563,495, filed on Sep. 21, 2009, now Pat. No. 8,482,947.

(60) Provisional application No. 61/230,546, filed on Jul. 31, 2009.

(51) Int. Cl.
*H02M 7/493* (2007.01)
*H02M 5/458* (2006.01)
(Continued)

(52) U.S. Cl.
CPC ............... *H02M 5/458* (2013.01); *H02J 3/38* (2013.01); *H02M 1/12* (2013.01); *H02M 7/48* (2013.01); *H02M 1/15* (2013.01); *H02M 2001/007* (2013.01)

(58) Field of Classification Search
CPC ......... H02M 7/48; H02M 7/47; H02M 7/493; H02M 1/15; H02M 3/285; H02J 3/38
USPC ............................................. 363/65, 71, 132
See application file for complete search history.

(56) References Cited

U.S. PATENT DOCUMENTS 3,670,230 A    6/1972    Rooney et al.
4,114,048 A    9/1978    Hull
(Continued)

FOREIGN PATENT DOCUMENTS

CA    2353422 C    3/2004
CA    2655007 A1    8/2010
(Continued)

OTHER PUBLICATIONS

Ferriera, et al. "Powerline Communications: Theory and Applications for Narrowband and Broadband Communications over Power Lines," Aug. 2010, Chapter 2, 120 pages.
(Continued)

*Primary Examiner* — Adolf Berhane
*Assistant Examiner* — Yemane Mehari
(74) *Attorney, Agent, or Firm* — Barnes & Thornburg LLP

(57) ABSTRACT

An apparatus and method for controlling the delivery of power from a DC source to an AC grid includes an inverter configured to deliver power from the unipolar input source to the AC grid and an inverter controller. The inverter includes an input converter, an active filter, and an output converter. The inverter controller includes an input converter controller, an active filter controller and an output converter controller. The input converter controller is configured to control a current delivered by the input converter to a galvanically isolated unipolar bus of the inverter. The output converter is configured to control the output converter to deliver power to the AC grid. Additionally, the active filter controller is configured to control the active filter to supply substantially all the power that is deliver by the output controller to the AC grid at a grid frequency.

20 Claims, 23 Drawing Sheets

(51) Int. Cl.
  *H02J 3/38* (2006.01)
  *H02M 1/12* (2006.01)
  *H02M 7/48* (2007.01)
  *H02M 1/15* (2006.01)
  *H02M 1/00* (2007.01)

(56) References Cited

U.S. PATENT DOCUMENTS

| | | |
|---|---|---|
| 4,217,633 A | 8/1980 | Evans |
| 4,277,692 A | 7/1981 | Small |
| 4,287,465 A | 9/1981 | Godard et al. |
| 4,651,265 A | 3/1987 | Stacey et al. |
| 4,661,758 A | 4/1987 | Whittaker |
| 4,707,774 A | 11/1987 | Kajita |
| 4,709,318 A | 11/1987 | Gephart et al. |
| 4,719,550 A | 1/1988 | Powell et al. |
| 4,725,740 A | 2/1988 | Nakata |
| 5,041,959 A | 8/1991 | Walker |
| 5,148,043 A | 9/1992 | Hirata et al. |
| 5,160,851 A | 11/1992 | McAndrews |
| 5,191,519 A | 3/1993 | Kawakami |
| 5,309,073 A | 5/1994 | Kaneko et al. |
| 5,343,380 A | 8/1994 | Champlin |
| 5,345,375 A * | 9/1994 | Mohan .................. 363/40 |
| 5,473,528 A | 12/1995 | Hirata |
| 5,499,178 A | 3/1996 | Mohan |
| 5,668,464 A | 9/1997 | Krein |
| 5,684,385 A | 11/1997 | Guyonneau et al. |
| 5,721,481 A | 2/1998 | Narita et al. |
| 5,745,356 A | 4/1998 | Tassitino |
| 5,796,182 A | 8/1998 | Martin |
| 5,801,519 A | 9/1998 | Midya et al. |
| 5,886,890 A | 3/1999 | Ishida et al. |
| 5,929,537 A | 7/1999 | Glennon |
| 5,978,236 A | 11/1999 | Faberman et al. |
| 5,982,645 A | 11/1999 | Levran et al. |
| 6,046,402 A | 4/2000 | More |
| 6,154,379 A | 11/2000 | Okita |
| 6,157,168 A | 12/2000 | Malik |
| 6,180,868 B1 | 1/2001 | Yoshino et al. |
| 6,201,180 B1 | 3/2001 | Meyer et al. |
| 6,201,319 B1 | 3/2001 | Simonelli et al. |
| 6,225,708 B1 | 5/2001 | Furukawa |
| 6,268,559 B1 | 7/2001 | Yamawaki |
| 6,285,572 B1 | 9/2001 | Onizuka et al. |
| 6,291,764 B1 | 9/2001 | Ishida et al. |
| 6,311,279 B1 | 10/2001 | Nguyen |
| 6,356,471 B1 | 3/2002 | Fang |
| 6,369,461 B1 | 4/2002 | Jungreis et al. |
| 6,381,157 B2 | 4/2002 | Jensen |
| 6,445,089 B1 | 9/2002 | Okui |
| 6,462,507 B2 | 10/2002 | Fisher |
| 6,489,755 B1 | 12/2002 | Boudreaux et al. |
| 6,563,234 B2 | 5/2003 | Hasegawa et al. |
| 6,605,881 B2 | 8/2003 | Takehara et al. |
| 6,614,132 B2 | 9/2003 | Hockney et al. |
| 6,624,533 B1 | 9/2003 | Swanson |
| 6,657,321 B2 | 12/2003 | Sinha |
| 6,700,802 B2 | 3/2004 | Ulinski et al. |
| 6,727,602 B2 | 4/2004 | Olson |
| 6,750,391 B2 | 6/2004 | Bower et al. |
| 6,765,315 B2 | 7/2004 | Hammerstrom |
| 6,770,984 B2 | 8/2004 | Pai |
| 6,795,322 B2 | 9/2004 | Aihara et al. |
| 6,838,611 B2 | 1/2005 | Kondo et al. |
| 6,847,196 B2 | 1/2005 | Garabandic |
| 6,881,509 B2 | 4/2005 | Jungreis |
| 6,882,063 B2 | 4/2005 | Droppo et al. |
| 6,950,323 B2 | 9/2005 | Achleitner |
| 7,031,176 B2 | 4/2006 | Kotsopoulos et al. |
| 7,072,195 B2 | 7/2006 | Xu |
| 7,091,707 B2 | 8/2006 | Cutler |
| 7,193,872 B2 | 3/2007 | Siri |
| 7,233,130 B1 | 6/2007 | Kay |
| 7,289,341 B2 | 10/2007 | Hesterman |
| 7,319,313 B2 | 1/2008 | Dickerson et al. |
| 7,324,361 B2 | 1/2008 | Siri |
| 7,339,287 B2 | 3/2008 | Jepsen et al. |
| 7,365,998 B2 | 4/2008 | Kumar |
| 7,405,494 B2 | 7/2008 | Tassitino, Jr. et al. |
| 7,420,354 B2 | 9/2008 | Cutler |
| 7,432,691 B2 | 10/2008 | Cutler |
| 7,463,500 B2 | 12/2008 | West |
| 7,502,697 B2 | 3/2009 | Holmquist et al. |
| 7,521,914 B2 | 4/2009 | Dickerson et al. |
| 7,531,993 B2 | 5/2009 | Udrea et al. |
| 7,551,460 B2 | 6/2009 | Lalithambika et al. |
| 7,577,005 B2 | 8/2009 | Angerer et al. |
| 7,592,789 B2 | 9/2009 | Jain |
| 7,609,040 B1 | 10/2009 | Jain |
| 7,626,834 B2 | 12/2009 | Chisenga et al. |
| 7,638,899 B2 | 12/2009 | Tracy et al. |
| 7,646,116 B2 | 1/2010 | Batarseh et al. |
| 7,660,139 B2 | 2/2010 | Garabandic |
| 7,667,610 B2 | 2/2010 | Thompson |
| 7,693,174 B2 | 4/2010 | Ishibashi et al. |
| 7,710,752 B2 | 5/2010 | West |
| 7,733,679 B2 | 6/2010 | Luger et al. |
| 7,768,155 B2 | 8/2010 | Fornage |
| 7,777,587 B2 | 8/2010 | Stevenson et al. |
| 7,796,412 B2 | 9/2010 | Fornage |
| RE41,965 E | 11/2010 | West |
| 7,839,022 B2 | 11/2010 | Wolfs |
| 7,855,906 B2 | 12/2010 | Klodowski et al. |
| RE42,039 E | 1/2011 | West et al. |
| 7,884,500 B2 | 2/2011 | Kernahan |
| 7,899,632 B2 | 3/2011 | Fornage et al. |
| 7,916,505 B2 | 3/2011 | Fornage |
| 8,076,802 B2 | 12/2011 | Fornage |
| 8,189,789 B2 | 5/2012 | Coan et al. |
| 2001/0043050 A1 | 11/2001 | Fisher |
| 2002/0017822 A1 | 2/2002 | Umemura et al. |
| 2002/0196026 A1 | 12/2002 | Kimura et al. |
| 2004/0128387 A1 | 7/2004 | Chin et al. |
| 2005/0180175 A1 * | 8/2005 | Torrey et al. .................. 363/17 |
| 2005/0213272 A1 | 9/2005 | Kobayashi |
| 2006/0067137 A1 | 3/2006 | Udrea |
| 2006/0067222 A1 | 3/2006 | Endoh |
| 2006/0083039 A1 | 4/2006 | Oliveira |
| 2006/0122857 A1 | 6/2006 | DeCotiis et al. |
| 2007/0040539 A1 | 2/2007 | Cutler |
| 2007/0040540 A1 | 2/2007 | Cutler |
| 2007/0133241 A1 | 6/2007 | Mumtaz et al. |
| 2007/0221267 A1 | 9/2007 | Fornage |
| 2008/0055952 A1 | 3/2008 | Chisenga et al. |
| 2008/0078436 A1 | 4/2008 | Nachamkin et al. |
| 2008/0106921 A1 | 5/2008 | Dickerson et al. |
| 2008/0183338 A1 | 7/2008 | Kimball et al. |
| 2008/0203397 A1 | 8/2008 | Amaratunga et al. |
| 2008/0266922 A1 | 10/2008 | Mumtaz et al. |
| 2008/0272279 A1 | 11/2008 | Thompson |
| 2008/0283118 A1 | 11/2008 | Rotzoll et al. |
| 2008/0285317 A1 | 11/2008 | Rotzoll |
| 2008/0304296 A1 | 12/2008 | NadimpalliRaju et al. |
| 2009/0000654 A1 | 1/2009 | Rotzoll et al. |
| 2009/0020151 A1 | 1/2009 | Fornage |
| 2009/0066357 A1 | 3/2009 | Fornage |
| 2009/0073726 A1 | 3/2009 | Babcock |
| 2009/0079383 A1 | 3/2009 | Fornage et al. |
| 2009/0080226 A1 | 3/2009 | Fornage |
| 2009/0084426 A1 | 4/2009 | Fornage et al. |
| 2009/0086514 A1 | 4/2009 | Fornage et al. |
| 2009/0097283 A1 | 4/2009 | Krein et al. |
| 2009/0147554 A1 | 6/2009 | Adest et al. |
| 2009/0184695 A1 | 7/2009 | Mocarski |
| 2009/0200994 A1 | 8/2009 | Fornage |
| 2009/0225574 A1 | 9/2009 | Fornage |
| 2009/0230782 A1 | 9/2009 | Fornage |
| 2009/0242011 A1 | 10/2009 | Proisy |
| 2009/0242272 A1 | 10/2009 | Little et al. |
| 2009/0243587 A1 | 10/2009 | Fornage |
| 2009/0244929 A1 | 10/2009 | Fornage |
| 2009/0244939 A1 | 10/2009 | Fornage |
| 2009/0244947 A1 | 10/2009 | Fornage |

(56) References Cited

U.S. PATENT DOCUMENTS

| | | | |
|---|---|---|---|
| 2009/0296348 | A1 | 12/2009 | Russell et al. |
| 2010/0085035 | A1 | 4/2010 | Fornage |
| 2010/0088052 | A1 | 4/2010 | Yin et al. |
| 2010/0091532 | A1 | 4/2010 | Fornage |
| 2010/0106438 | A1 | 4/2010 | Fornage |
| 2010/0138771 | A1 | 6/2010 | Kumar et al. |
| 2010/0139945 | A1 | 6/2010 | Dargatz |
| 2010/0162256 | A1 | 6/2010 | Branover et al. |
| 2010/0175338 | A1 | 7/2010 | Garcia Cors |
| 2010/0176771 | A1 | 7/2010 | Fieldhouse et al. |
| 2010/0181830 | A1 | 7/2010 | Fornage et al. |
| 2010/0195357 | A1 | 8/2010 | Fornage et al. |
| 2010/0195665 | A1 | 8/2010 | Jackson |
| 2010/0214808 | A1 | 8/2010 | Rodriguez |
| 2010/0222933 | A1 | 9/2010 | Smith et al. |
| 2010/0236612 | A1 | 9/2010 | Khajehoddin et al. |
| 2010/0263704 | A1 | 10/2010 | Fornage et al. |
| 2010/0283325 | A1 | 11/2010 | Marcianesi et al. |
| 2010/0309695 | A1 | 12/2010 | Fornage |
| 2011/0012429 | A1 | 1/2011 | Fornage |
| 2011/0019444 | A1 | 1/2011 | Dargatz et al. |
| 2011/0026281 | A1 | 2/2011 | Chapman et al. |
| 2011/0026282 | A1 | 2/2011 | Chapman et al. |
| 2011/0043160 | A1 | 2/2011 | Serban |
| 2011/0049990 | A1 | 3/2011 | Amaratunga et al. |
| 2011/0051820 | A1 | 3/2011 | Fornage |
| 2011/0130889 | A1 | 6/2011 | Khajehoddin et al. |

FOREIGN PATENT DOCUMENTS

| | | |
|---|---|---|
| CA | 2693737 A1 | 8/2010 |
| DE | 20012131 U1 | 3/2001 |
| EP | 1794799 A1 | 6/2007 |
| EP | 1803161 A1 | 7/2007 |
| EP | 1837985 A2 | 9/2007 |
| GB | 2419968 A | 5/2006 |
| GB | 2421847 A | 7/2006 |
| GB | 2439648 A | 1/2008 |
| GB | 2434490 B | 4/2009 |
| GB | 2454389 A | 5/2009 |
| GB | 2455753 A | 6/2009 |
| GB | 2455755 A | 6/2009 |
| NL | 1021582 C2 | 4/2004 |
| NL | 1021591 C2 | 4/2004 |
| WO | 2004008619 A2 | 1/2004 |
| WO | 2004100348 A1 | 11/2004 |
| WO | 2004100348 A8 | 12/2005 |
| WO | 2006048688 A1 | 5/2006 |
| WO | 2007080429 A2 | 7/2007 |
| WO | 2009081205 A2 | 7/2009 |
| WO | 2009081205 A3 | 10/2009 |
| WO | 2009134756 A1 | 11/2009 |

OTHER PUBLICATIONS

Ferriera, et al. "Powerline Communications: Theory and Applications for Narrowband and Broadband Communications over Power Lines," Aug. 2010, Chapter 4, 48 pages.

Ferriera, et al. "Powerline Communications: Theory and Applications for Narrowband and Broadband Communications over Power Lines," Aug. 2010, Chapter 5, 116 pages.

U.S. Appl. No. 13/538,723 by Rothblum, et al., "Device, System, and Method for Communicating with a Power Inverter Using Power Line Communications," filed Jun. 29, 2012, 45 pages.

PCT Search Report, International Application No. PCT/US2010/041161, dated Sep. 2, 2010.

Ando et al., "Development of Single Phase UPS Having AC Chopper and Active Filter Ability," IEEE International Conference on Industrial Technology, 10.1109/ICIT.2006.372445, pp. 1498-1503, 2006.

Biel et al., "Sliding-Mode Control Design of a Boost-Buck Switching Converter for AC Signal Generation," vol. 51, issue 8, pp. 1539-1551, 2004.

Biel et al., "Sliding-Mode Control of a Single-Phase AC/DC/AC Converter," Proceedings of the 40th IEEE Conference on Decision and Control, vol. 1., pp. 903-907, Dec. 2001.

Bose et al., "Electrolytic Capacitor Elimination in Power Electronic System by High Frequency Filter," Conference Record of the 1991 IEEE Industry Applications Society Annual Meeting, vol. 1, pp. 869-878, 1991.

Bower et al., "Innovative PV Micro-inverter Topology Eliminates Electrolytic Capacitors for Longer Lifetime," Conference Record of the 2006 IEEE 4th World Conference on Photovoltaic Energy Conversion, vol. 2, pp. 2038-2041, May 2006.

Bower, "The AC PV Building Block-Ultimate Plug-n-Play That Brings Photovoltaics Directly to the Customer," Proceedings of the National Center for Photovoltaics (NCPV) and Solar Program Review Meeting, pp. 311-314, May 2003.

Brekken et al., "Utility-Connected Power Converter for Maximizing Power Transfer From a Photovoltaic Source While Drawing Ripple-Free Current," 2002 IEEE 33rd Annual Power Electronics Specialists Conference, vol. 3, pp. 1518-1522, 2002.

Brekken, "Utility-Connected Power Converter for Maximizing Power Transfer From a Photovoltaic Source," Thesis Submitted to the Faculty of the Graduate School of the University of Minnesota, Jun. 2002, 56 pages.

Bush, "UK Solar Firm Discloses Novel Inverter Topology," ElectronicsWeekly.com. Apr. 2011, last accessed Aug. 30, 2011 at http://www.electronicsweekly.com/Articles/2011/O4/26/50953/UK-solar-firm-discloses-novel-inverter-topology.htm.

Chang et al., "The Impact of Switching Strategies on Power Quality for Integral Cycle Controllers," IEEE Transactions on Power Delivery, vol. 18, No. 3, pp. 1073-1078, Jul. 2003.

Chisenga, "Development of a Low Power Photovoltaic Inverter for Connection to the Utility Grid," PhD Thesis, Fitzwilliam College, Cambridge, 173 pages, 2007.

Di Napoli et al., "Multiple-Input DC-DC Power Converter for Power-Flow Management in Hybrid Vehicles," Conference Rec. IEEE Industrial Applications Soc. Annual Meeting, pp. 1578-1585, 2002.

Edelmoser, "Improved Solar Inverter With Wide Input Voltage Range," IEEE 10th Mediterranean Conference, MEleCon 2000, vol. 2, pp. 810-813, 2000.

Enphase Energy, "Application Note: Multi-Tenant Design Guidelines," rev. 1, 5 pages, 2008.

Enphase Energy, "Enphase Field Wiring Diagram—M190 & M210 Microinverters—240v, Single Phase," Drawing No. 144-00001, rev. 6, 1 page, 2009.

Enphase Energy, "Enphase Micro-Inverter Technical Data," Doc. No. 142-00004, rev. 2, 2 pages, 2008.

Esram et al., "Comparison of Photovoltaic Array Maximum Power Point Tracking Techniques," IEEE Transactions on Energy Conversion, vol. 22, No. 2, pp. 439-449, Jun. 2007.

Henze et al., "A Novel AC Module with High-Voltage Panels in CIS Technology," 23rd European Photovoltaic Solar Energy Conference, Valencia, Spain, ISBN 3-936338-24-8, 8 pages, Sep. 2008.

Hu et al., "Efficiency Improvement of Grid-tied Inverters at Low Input Power Using Pulse Skipping Control Strategy," Twenty-Fifth Annual IEEE Applied Power Electronics Conference and Exposition, pp. 627-633, Feb. 2010.

Hung et al., "Analysis and Implementation of a Delay-compensated Deadbeat Current Controller for Solar Inverters," IEEE Proceedings—Circuits, Devices and Systems, pp. 279-286, 2001.

Itoh et al., "Ripple Current Reduction of a Fuel Cell for a Single-Phase Isolated Converter using a DC Active Filter with a Center Tap," Twenty-Fourth Annual IEEE Applied Power Electronics Conference and Exposition, APEC '09, pp. 1813-1818, 2009.

Jantsch et al., "AC PV Module Inverters With Full Sine Wave Burst Operation Mode for Improved Efficiency of Grid Connected Systems at Low Irradiance," Proceedings of the 14th European Photovoltaic Solar Energy Conference, 5 pages, 1997.

Jeong et al., "An Improved Method for Anti-Islanding by Reactive Power Control," pp. 965-970, 2005.

Jung et al., "A Feedback Linearizing Control Scheme for a PWM Converter-Inverter Having a Very Small DC-Link Capacitor," IEEE Transactions on Industry Applications, vol. 35., issue 5, pp. 1124-1131, 1999.

(56) References Cited

OTHER PUBLICATIONS

Jung et al., "High-frequency DC Link Inverter for Grid-Connected Photovoltaic System," Conference Record of the Twenty-Ninth IEEE Photovoltaic Specialists Conference, pp. 1410-1413, 2002.

Kern, "SunSine300: Manufacture of an AC Photovoltaic Module, Final Report, Phases I & II, Jul. 25, 1995-Jun. 30, 1998," NREL/SR-520-26085, 1999, 32 pages.

Khajehoddin et al., "A Nonlinear Approach to Control Instantaneous Power for Single-phased Grid-connected Photovoltaic Systems," IEEE Energy Conversion Congress and Exposition (ECCE), pp. 2206-2212, 2009.

Khajehoddin et al., "A Novel Topology and Control Strategy for Maximum Power Point Trackers and Multi-string Grid-connected PV Inverters," Applied Power Electronics Conference, APECO8, pp. 173-178, 2008.

Khajehoddin et al., "A Robust Power Decoupler and Maximum Power Point Tracker Topology for a Grid-Connected Photovoltaic System," IEEE Power Electronics Specialists Conference, PESCO8, pp. 66-69, 2008.

Kim et al., "New Control Scheme for AC-DC-AC Converter Without DC Link Electrolytic Capacitor," 24th Annual IEEE Power Electronics Specialists Conference, PESC '93 Record., pp. 300-306, 1993.

Kitano et al., "Power Sensor-less MPPT Control Scheme Utilizing Power Balance at DC Link—System Design to Ensure Stability and Response," The 27th Annual Conference of the IEEE Industrial Electronics Society, vol. 2, pp. 1309-1314, 2001.

Kern, "Inverter Technology for the Solar Industry," Siemens Energy & Automation, 2009, 20 pages.

Curran, "Grid-Connected Solar Microinverter Reference Design," Microchip Technology Incorporated, 2010, 31 pages.

Nikraz et al., "Digital Control of a Voltage Source Inverter in Photovoltaic Applications," 35th Annual IEEE Power Electronics Specialists Conference, pp. 3266-3271, 2004.

Oldenkamp et al., "AC Modules: Past, Present and Future, Workshop Installing the Solar Solution," Jan. 1998, Hatfield, UK, 6 pages.

Pajic et al., "Unity Power Factor Compensation for Burst Modulated Loads," IEEE Power Engineering Society General Meeting, vol. 2, pp. 1274-1277, 2003.

Ramos et al., "A Fixed-Frequency Quasi-Sliding Control Algorithm: Application to Power Inverters Design by Means of FPGA Implementation," IEEE Transactions on Power Electronics, vol. 18, No. 1, pp. 344-355, Jan. 2003.

Rodriguez et al., "Analytic Solution to the Photovoltaic Maximum Power Point Problem," IEEE Transactions on Circuits and Systems, vol. 54, No. 9, pp. 2054-2060, Sep. 2007.

Rodriguez et al., "Dynamic Stability of Grid-Connected Photovoltaic Systems," Power Engineering Society General Meeting, vol. 2, pp. 2193-2199, 2004.

Rodriguez et al., "Long-Lifetime Power Inverter for Photovoltaic AC Modules," IEEE Transaction on Industrial Electronics, vol. 55, No. 7, pp. 2593-2601, Jul. 2008.

Ropp et al., "Determining the Relative Effectiveness of Islanding Detection Methods Using Phase Criteria and Nondetection Zones," IEEE Transactions on Energy Conversion, vol. 15, No. 3, pp. 290-296, Sep. 2000.

Russell et al., "SunSine300 AC Module, Annual Report Jul. 25, 1995-Dec. 31, 1996," NREL/SR-520-23432, UC Category 1280, 1997, 31 pages.

Schmidt et al., "Control of an Optimized Converter for Modular Solar Power Generation," 20th International Conference on Industrial Electronics, Control and Instrumentation, vol. 1, pp. 479-484, 1994.

Schutten et al., "Characteristics of Load Resonant Converters Operated in a High-Power Factor Mode," IEEE, Trans. Power Electronics, vol. 7, No. 2, pp. 5-16, 1991.

Sen et al., "A New DC-TO-AC Inverter With Dynamic Robust Performance," 1998 IEEE Region 10 International Conference on Global Connectivity in Energy, Computer, Communication and Control, vol. 2, pp. 387-390, 1998.

Shimizu et al., "Flyback-Type Single-Phase Utility Interactive Inverter with Power Pulsation Decoupling on the DC Input for an AC Photovoltaic Module System," IEEE, Trans. Power Electronics, vol. 21, No. 5, pp. 1264-1272, Sep. 2006.

Singh et al., "Comparison of PI, VSC and Energy Balance Controller for Single Phase Active Filter Control," 1998 IEEE Region 10 International Conference on Global Connectivity in Energy, Computer, Communication and Control, vol. 2, pp. 607-614, 1998.

Strong et al., "Development of Standardized, Low-Cost AC PC Systems—Phase I Annual Report," NREL/SR-520-23002, Jun. 1997, 18 pages.

Strong et al., "Development of Standardized, Low-Cost AC PV Systems—Final Technical Report," NREL/SR-520-26084, Feb. 1999, 27 pages.

Sung et al., "Novel Concept of a PV Power Generation System Adding the Function of Shunt Active Filter," 2002 Transmission and Distribution Conference and Exhibition: Asia Pacific, vol. 3, pp. 1658-1663, 2002.

Takahashi et al., "Development of Long Life Three Phase Uninterruptible Power Supply Using Flywheel Energy Storage Unit," Proc. Int'l Conf. Power Electronics, vol. 1, pp. 559-564, 1996.

Takahashi et al., "Electrolytic Capacitor-Less PWM Inverter," in Proceedings of the IPEC '90, Tokyo, Japan, pp. 131-138, Apr. 2-6, 1990.

Thomas et al., "Design and Performance of Active Power Filters," IEEE IAS Magazine, 9 pages, 1998.

Tian, "Solar-Based Single-Stage High-Efficiency Grid-Connected Inverter," Masters Thesis, University of Central Florida, Orlando, 83 pages, 2005.

Vezzini et al., "Potential for Optimisation of DC-DC Converters for Renewable Energy by use of High Bandgap Diodes," 35th Annual IEEE Power Electronics Specialists Conference, vol. 5, 3836-3842, 2004.

Wada et al., "Reduction Methods of Conducted EMI Noise on Parallel Operation for AC Module Inverters," 2007 IEEE Power Electronics Specialists Conference, pp. 3016-3021, Jun. 2007.

Wu et al., "A Single-Phase Inverter System for PV Power Injection and Active Power Filtering With Nonlinear Inductor Consideration," IEEE Transactions on Industry Applications, vol. 41, No. 4, pp. 1075-1083, 2005.

Wu, et al., "A 1φ 3W Grid-Connection PV Power Inverter with APF Based on Nonlinear Programming and FZPD Algorithm," Eighteenth Annual IEEE Applied Power Electronics Conference and Exposition, APEC '03, vol. 1, pp. 546-5552, 2003.

Wu, et al., "A 1φ 3W Grid-Connection PV Power Inverter with Partial Active Power Filter," IEEE Transactions on Aerospace and Electronic Systems, vol. 39, No. 2, pp. 635-646, Apr. 2003.

Wu, et al., "PV Power Injection and Active Power Filtering With Amplitude-Clamping and Amplitude-Scaling Algorithms," IEEE Trans. on Industry Applications, vol. 43, No. 3, pp. 731-741, 2007.

Xue et al., "Topologies of Single-Phase Inverters for Small Distributed Power Generators: An Overview," IEEE Transactions on Power Electronics, vol. 19, No. 5, pp. 1305-1314, 2004.

Kjaer et al., "A Novel Single-Stage Inverter for the AC-module with Reduced Low-Frequency Ripple Penetration," EPE 2003, ISBN 90-75815-07-7, 10 pages, 2003.

Kjaer et al., "A Review of Single-phase Grid-connected Inverters for Photovoltaic Modules," IEEE Trans on Power Electronics, vol. 41, No. 5, pp. 1292-1306, 2005.

Kjaer et al., "Design Optimization of a Single Phase Inverter for Photovoltaic Applications," IEEE 34th Annual Power Electronics Specialist Conference, PESC '03, vol. 3, pp. 1183-1190, 2003.

Kjaer et al., "Power Inverter Topologies for Photovoltaic Modules—A Review," Conf. record of the 37th Industry Applications Conference, vol. 2, pp. 782-788, 2002.

Kjaer, "Design and Control of an Inverter for Photovoltaic Applications," PhD Thesis, Aalborg University Institute of Energy Technology, 236 pages, 2005.

Kjaer, "Selection of Topologies for the PHOTOENERGYTM Project," Aalborg University Institute of Energy Technology, 37 pages, 2002.

(56) References Cited

OTHER PUBLICATIONS

Kotsopoulos et al., "A Predictive Control Scheme for DC Voltage and AC Current in Grid-Connected Photovoltaic Inverters with Minimum DC Link Capacitance," The 27th Annual Conference of the IEEE Industrial Electronics Society, vol. 3, pp. 1994-1999, 2001.

Kotsopoulos et al., "Predictive DC Voltage Control of Single-Phase PV Inverters with Small DC Link Capacitance," 2003 IEEE International Symposium on Industrial Electronics, vol. 2, pp. 793-797, 2003.

Kutkut, "PV Energy Conversion and System Integration," Florida Energy Systems Consortium, 2009, 24 pages.

Kwon et al., "High-efficiency Module-integrated Photovoltaic Power Conditioning System," IET Power Electronics, doi: 10.1049/iet-pel. 2008.0023, 2008.

Lohner et al., "A New Panel-integratable Inverter Concept for Grid-Connected Photovoltaic Systems," IEEE ISIE '96, vol. 2, pp. 827-831, 1996.

Martins et al., "Analysis of Utility Interactive Photovoltaic Generation System Using a Single Power Static Inverter," Conference Record of the Twenty-Eighth IEEE Photovoltaic Specialists Conference, pp. 1719-1722, 2000.

Martins et al., "Interconnection of a Photovoltaic Panels Array to a Single-Phase Utility Line From a Static Conversion System," Proc. IEEE Power Electronics Specialists Conf., pp. 1207-1211, 2000.

Martins et al., "Usage of the Solar Energy from the Photovoltaic Panels for the Generation of Electrical Energy," The 21st International Telecommunication Energy Conference, 6 pages, 1999.

Matsui et al, "A New Maximum Photovoltaic Power Tracking Control Scheme Based on Power Equilibrium at DC Link," Conference Record of the 1999 IEEE Thirty-Fourth IAS Annual Meeting, vol. 2, pp. 804-809, 1999.

Meinhardt et al., "Miniaturised 'low profile' Module Integrated Converter for Photovoltaic Applications with Integrated Magnetic Components," IEEE APEC '99, vol. 1, pp. 305-311, 1999.

Meza et al., "Boost-Buck Inverter Variable Structure Control for Grid-Connected Photovoltaic Systems," IEEE International Symposium on Circuits and Systems, vol. 2, pp. 1318-1321, 2005.

Midya et al., "Dual Switched Mode Power Converter," 15th Annual Conference of IEEE Industrial Electronics Society, vol. 1, pp. 155-158, Mar. 1989.

Midya et al., "Sensorless Current Mode Control—An Observer-Based Technique for DC-DC Converters," IEEE Transactions on Power Electronics, vol. 16, No. 4, pp. 522-526, Jul. 2001.

International Search Report and Written Opinion for Application No. PCT/US2011/055685, dated Apr. 3, 2012, 14 pages.

\* cited by examiner $v_{AF}$ (V)

$i_{AF}$ (A)

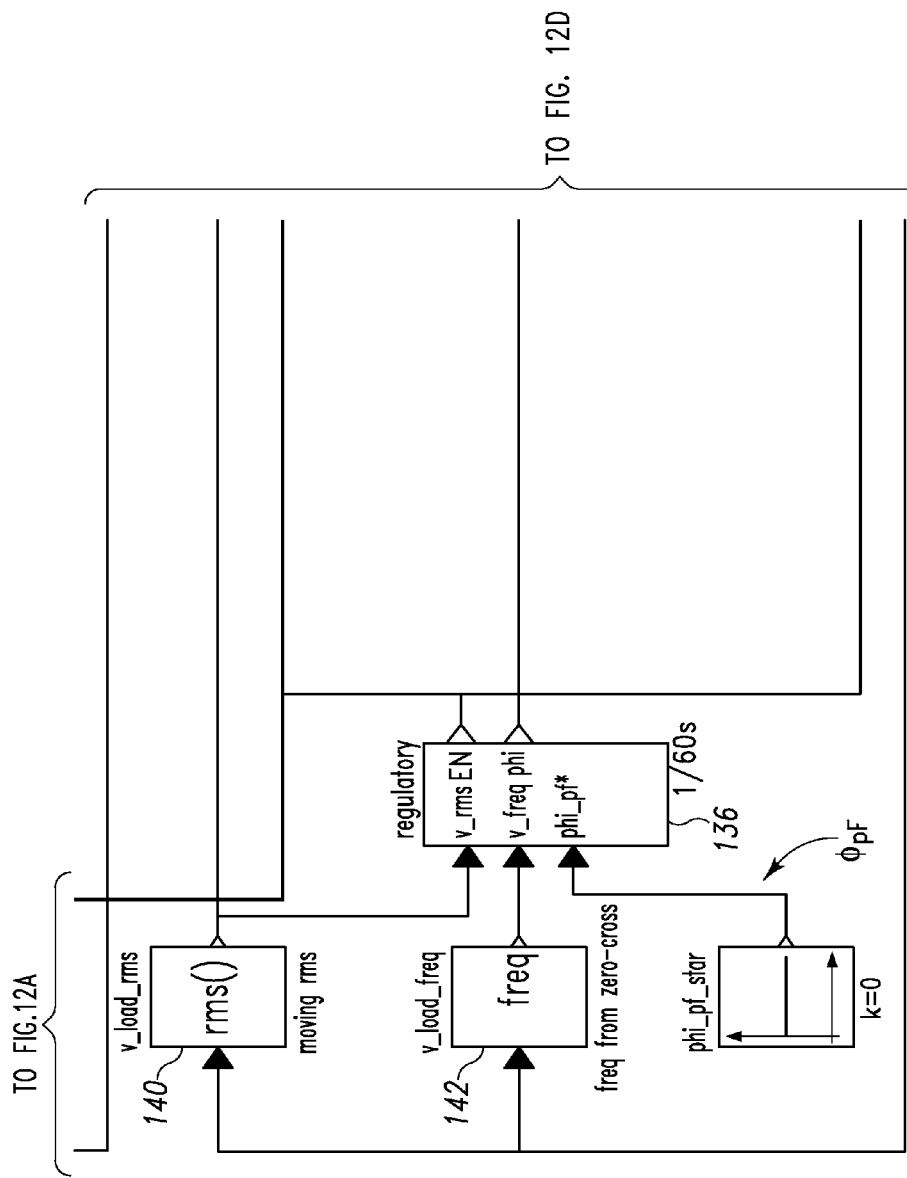

APPARATUS AND METHOD FOR CONTROLLING DC-AC POWER CONVERSION

CROSS-REFERENCE TO RELATED U.S. PATENT APPLICATION

This application is a continuation application of U.S. application Ser. No. 12/563,495, now U.S. Pat. No. 8,482,947, entitled "Apparatus and Method for Controlling DC-AC Power Conversion," which was filed on Sep. 21, 2009 and which claims priority under 35 U.S.C. §119(e) to U.S. Provisional Patent Application Ser. No. 61/230,546 entitled "Apparatus for Converting Direct Current to Alternating Current," by Robert S. Balog, Jr. et al., which was filed on Jul. 31, 2009, the entirety of both of which is hereby incorporated by reference.

Cross-reference is made to U.S. Utility patent application Ser. No. 12/563,499 entitled "Apparatus for Converting Direct Current to Alternating Current" by Patrick P. Chapman et al., which was filed on Sep. 21, 2009, and to U.S. Utility patent application Ser. No. 11/871,015 entitled "Methods for Minimizing Double-Frequency Ripple Power in Single-Phase Power Conditioners" by Philip T. Krein. et al., which was filed on Oct. 11, 2007, the entirety of both of which is incorporated herein by reference.

TECHNICAL FIELD

The present disclosure relates, generally, to control of power converters that convert DC power to AC power and, more particularly, to control of DC-to-AC converters that deliver power from a photovoltaic source to an AC grid.

BACKGROUND

The amount of power that can be delivered by certain alternative energy sources, such as photovoltaic cells ("PV cells" or "solar cells"), may vary in magnitude over time owing to temporal variations in operating conditions. For example, the output of a typical PV cell will vary with variations in sunlight intensity, angle of incidence of sunlight, ambient temperature and other factors. One application of alternative energy sources is delivery of power to an alternating-current (AC) utility grid. In such applications, an inverter (i.e., a DC-AC power conditioner) is required in order to turn the DC power delivered by the alternative energy source into sinusoidal alternating-current (AC) power at the grid frequency. Certain inverters (e.g., those used by residential customers or small businesses) convert the DC power delivered by the alternative energy source into single-phase AC power and deliver a sinusoidal current to the AC grid at the grid frequency. One figure of merit for such an inverter is the utilization ratio, which is the percentage of available power that it can extract from an energy source. Ideally, an inverter will achieve a utilization ratio of 100%.

Some photovoltaic power systems comprise strings of solar cells that deliver relatively high DC voltages (e.g., nominal 450V). Because operating characteristics of cells in a large string will typically differ, and because individual cells may receive different amounts of sunlight, it is difficult or impossible to run large strings at the combined full power capacity of the individual cells. Strings also typically produce significant power (e.g., kilowatts), which requires a large inverter and high voltage wiring between the cells and the inverter. Additionally, failure of one inverter results in loss of power from the entire string.

Distributed photovoltaic power systems seek to overcome the problems of older, string-based, systems. In a distributed system, each one of a plurality of small, relatively low voltage (e.g. 25V), solar panels are provided with an inverter that feeds power to the AC grid. The benefits of such systems include improved utilization of total available solar cell power and a high level of redundancy: failure of a single inverter or panel may not result in a significant loss in delivered power.

Conversion efficiency in a distributed photovoltaic power system may be improved by placing the inverter in close proximity to its solar panel, thereby eliminating the need to bus a plurality of relatively high solar panel currents to remotely located inverters for processing. Putting the inverter next to its solar panel, however, exposes the inverter to relatively high operating temperatures and may make it more difficult to access for maintenance.

A basic electrical property of a single-phase AC power system is that the energy flow includes both an average power portion that delivers useful energy from the energy source to the load and a double-frequency portion that flows back and forth between the load and the source:

$$p(t)=Po+Po^*\cos(2\omega t+\phi). \quad (1)$$

In applications involving inverters, the double-frequency portion represents undesirable ripple power that, if reflected back into the DC power source, may compromise performance of the source. This is particularly true for photovoltaic cells.

Photovoltaic cells have a single operating point at which the values of the current and voltage of the cell result in a maximum power output. This "maximum power point" ("MPP") is a function of environmental variables, including light intensity and temperature. Inverters for photovoltaic systems typically comprise some form of maximum power point tracking ("MPPT") as a means of finding and tracking the maximum power point ("MPP") and adjusting the inverter to exploit the full power capacity of the cell at the MPP. Extracting maximum power from a photovoltaic cell requires that the cell operate continuously at its MPP; fluctuations in power demand, caused, for example, by double-frequency ripple power being reflected back into the cell, will compromise the ability of the inverter to deliver the cell's maximum power. One analysis has shown that that the amplitude of the ripple voltage across a photovoltaic module should be below 8.5% of the MPP voltage in order to reach a utilization ratio of 98%. Thus, it is preferable that inverters for photovoltaic energy systems draw only the average power portion of the energy flow from the photovoltaic cells at the inverter input. Such inverters should therefore comprise means to manage the double-frequency ripple power without reflecting it back into the source.

To manage double-frequency ripple power, energy needs to be stored and delivered at twice the AC frequency. One way to manage the double-frequency ripple power is to use passive filtering in the form of capacitance across a DC bus. This passive filtering arrangement requires a large capacitance value to filter the double-frequency power, since the energy exchange needs to be supported without imposing significant voltage ripple on the DC bus.

Another way to manage double-frequency ripple power is to use an active filter circuit that supplies the double-frequency ripple power by means of a capacitor internal to the active filter. Whereas the passive filtering approach requires a relatively large filter capacitor, the internal capacitor in an active filter may be made relatively much smaller, since it is only required to store and deliver the double-frequency ripple power and is not required to support the DC bus voltage. Because the active filter "isolates" the internal capacitor from the DC bus, the voltage variation across the internal capacitor can be relatively large and the value of the capacitor may be made relatively small.

SUMMARY

According to one aspect, an apparatus for controlling the delivery of power from a unipolar input source to an alternating-current (AC) grid at a grid voltage and grid frequency may include an inverter and an inverter controller. The inverter may include an input converter, an active filter, and an output converter. The input converter may be configured to deliver power from the unipolar input source to a galvanically isolated unipolar bus. The active filter may be configured to supply energy to and absorb energy from the unipolar bus. Additionally, the output converter may be configured to deliver power from the unipolar bus to the AC grid.

The inverter controller may be configured to maintain a voltage of the unipolar bus at a pre-determined value. The inverter may include an input converter controller, an output converter controller, and an active filter controller. The input converter controller may be configured to control a current delivered by the input converter to the unipolar bus. The output converter controller may be configured to control the output converter to deliver power to the AC grid. Additionally, the active filter controller may be configured to control the active filter to supply time-varying power to the output converter.

In some embodiments, the active filter controller may be configured to control the active filter to supply substantially all of the time-varying power that is delivered to the output converter at the grid frequency and harmonics of the grid frequency. Additionally, the average power delivered to the grid by the output converter may be controlled by the output converter controller to be substantially equal to the power delivered by the unipolar source less the substantial total of the power losses in the inverter. In some embodiments, the power delivered to the grid may be controlled by the output controller to comprise an average power component and a time-varying power component. Additionally, the active filter controller may control the active filter to deliver substantially all of the time-varying component.

In some embodiments, the active filter is configured as a switching power converter embodied as an active filter capacitor. In such embodiments, the active filter controller may be configured to control the time-varying component by controlling all of the time-varying current that flows in the active filter capacitor. Additionally, the time-varying component may comprise a component at twice the grid frequency. Further, the output converter controller may be configured control the output converter to deliver power to the AC grid in the form of a substantially sinusoidal current at the grid frequency.

In some embodiments, the input converter controller may be embodied as a current-mode controller. Additionally, the output converter controller may be embodied as a current-mode controller. The active filter controller may also be embodied as a current-mode controller. In some embodiments, the galvanic isolation is provided by a transformer. The input converter may be embodied as a current-fed converter. In some embodiments, the input converter may be embodied as an isolated boost converter.

In some embodiments, the switching power converter may be embodied as a half-bridge switching circuit comprising a pair of controllable switches connected to the active filter capacitor. Alternatively, the switching power converter may be embodied as a full-bridge switching circuit comprising two pairs of controllable switches connected to the active filter capacitor. The active filter may be configured to control the switches so that the current in the active filter capacitor comprises a time-varying component comprising harmonics at multiples of the grid frequency. Additionally or alternatively, the active filter controller may control the switches so that the voltage across the active filter capacitor is substantially unipolar.

Additionally, in some embodiments, the active filter controller may be configured to receive a measurement of the unipolar bus voltage, $V_{bus}$, and a setpoint value indicative of the said pre-determined value for the unipolar bus voltage, $V_{Sbus}$, and may be configured to control the current flowing in the active filter capacitor, $i_{CAF}$, so that the magnitude of a ripple voltage across the unipolar bus, at the grid frequency and harmonics of the grid frequency, is reduced towards zero. In some embodiments, the active filter controller may include a feedback controller that delivers a feedback control output, $i_{FB}$, that is a function of the difference between $V_{bus}$ and $V_{Sbus}$, and a scaling element that receives a measurement of the voltage across the active filter capacitor, $v_{CAF}$, and delivers a scaled control output equal to $i_{CAFI} = i_{FB} \cdot (V_{bus}/v_{CAF})$, wherein $i_{CAFI}$ is indicative of a time-varying magnitude of the current that is controlled to flow in the active filter capacitor. Additionally, the active filter controller may include a voltage limiter configured to deliver to the active filter a setpoint, $i_{SCAF}$, for the current that flows in the active filter capacitor, in accordance with the following logic: i) if the voltage $v_{CAF}$ is less than a pre-determined upper voltage limit and greater than a pre-determined lower voltage limit, $i_{SCAF}$ is set equal to $i_{CAFI}$; ii) if the voltage $v_{CAF}$ is less than the pre-determined lower voltage limit, $i_{SCAF}$ is forced to be of a polarity that causes $v_{CAF}$ to increase above the pre-determined lower voltage limit; and iii) if the voltage $v_{CAF}$ is greater than the pre-determined upper voltage limit, $i_{SCAF}$ is forced to be of a polarity that causes $v_{CAF}$ to decrease below the pre-determined upper voltage limit.

In some embodiments, the unipolar input source may be embodied as a photovoltaic cell. Alternatively, the unipolar input source may be embodied as a fuel cell. In some embodiments, the pre-determined value of the unipolar bus voltage is a constant value. Alternatively, the pre-determined value of the unipolar bus voltage may be a function of one or more variables. In some embodiments, the pre-determined value of the unipolar bus voltage may be a function of the magnitude of the grid voltage.

Further, in some embodiments, the unipolar input source comprises a photovoltaic ("PV") cell and the input converter controller comprises a maximum-power-point-tracking ("MPPT") device configured to determine the maximum amount of power that may be withdrawn from the photovoltaic cell. In such embodiments, the MPPT device is configured to deliver a setpoint value, $i_{SIC}$, for the current that is drawn by the input converter from the PV cell. The input converter controller may be configured to receive a measurement of the voltage of the unipolar input source, $V_I$, and to calculate and deliver a power delivery setpoint $P_S = V_I \cdot i_{SIC}$. In some embodiments, the input converter controller is configured to control the current drawn by the input converter to be essentially equal to $i_{SIC}$. Additionally, in some embodiments, the input converter controller is configured to receive a measurement of the unipolar bus voltage $V_{bus}$ and to alter the value of $i_{SIC}$ based upon the value of $V_{bus}$. In such embodiments, the input converter controller may be configured to progressively reduce $i_{SIC}$ as the value of $V_{bus}$ increases above a pre-determined limit.

The output converter may comprise, in some embodiments, a full-bridge switching circuit comprising two pairs of controllable switches configured to receive power from the unipolar bus and deliver power to the AC grid. Additionally, in some embodiments, the apparatus may further include an output filter connected between the output converter and the AC grid.

In some embodiments, the output converter controller may be configured to comprise a feedforward controller configured to receive: a measurement of the power delivered to the input converter by the unipolar input source, $P_S$, a measurement of the rms grid voltage, $V_L$, a measurement of a time-varying phase of the AC grid, $\theta$, a pre-determined setpoint value of a power factor angle, $\phi$, and wherein the feedforward controller controls the output converter to deliver to the AC grid a time-varying component of current essentially equal to: $i_{LFF}(t)=(\text{sqrt}(2)\cdot P_S/V_L)\cdot(\cos(\theta+\phi)/\cos(\phi))$. In such embodiments, (i) the active filter may be embodied as a switching power converter comprising an active filter capacitor and (ii) the active filter controller may be configured to control the current in the active filter capacitor such that the active filter supplies substantially all of the time-varying power delivered to the output converter at the grid frequency and harmonics of the grid frequency and in which the output converter controller comprises a feedback controller that receives: a measurement of the average voltage across the active filter capacitor, $v_{CAFA}$, and a pre-determined setpoint value indicative of a desired average value of the voltage across the active filter capacitor, $V_{CAFS}$, wherein the feedback controller controls the output converter to deliver to the AC grid an additional time-varying component of current, which, when combined with $i_{LFF}(t)$, causes $v_{CAFA}$ to be essentially equal to $V_{CAFS}$.

In some embodiments, the output converter controller may be configured to receive a measurement of the unipolar bus voltage $V_{bus}$ and to alter the magnitude of the current delivered to the AC grid based upon the value of $V_{bus}$. Additionally, the output converter controller may be configured to progressively reduce the magnitude of the current delivered to the AC grid as the value of $V_{bus}$ decreases below a pre-determined limit. In some embodiments, the output converter controller may comprise a filter that receives a measurement of the voltage across the active filter capacitor and delivers the measurement of the average voltage across the active filter capacitor, $v_{CAFA}$. In some embodiments, the filter may comprise a notch filter configured to exhibit a sharp attenuation at a frequency equal to twice the grid frequency. Additionally, the filter may further a low-frequency rolloff filter having a pole at a frequency equal to one-tenth of the grid frequency.

According to another aspect, a method for controlling an inverter that is configured to deliver power from a unipolar input source to an alternating-current ("AC") grid at a grid voltage and grid phase may include delivering a pre-determined amount of power from the unipolar input source to a unipolar bus that is galvanically isolated from the unipolar input source using an input converter. The method may also include supplying energy to and absorbing energy from the unipolar bus using an active filter comprising an active filter capacitor and delivering power from the unipolar bus to the AC grid using an output converter. Additionally, the method may include controlling the operation of the inverter using an inverter controller. For example, controlling the operation of the inverter may include controlling the operation of the input converter to deliver substantially all the average power delivered to the AC grid, controlling the active filter to deliver substantially all the time-varying power that is delivered to the AC grid, and regulating the unipolar bus voltage to a first pre-determined value.

In some embodiments, delivering the predetermined amount of power may include delivering the predetermined amount of power from the unipolar input source to the unipolar bus using an input converter comprising a switching power converter. In such embodiments, controlling the operation of the input converter may include controlling the input converter using an input converter controller of the inverter controller to deliver the said substantially all the average power delivered to the AC grid. Additionally, in some embodiments, supplying energy to and absorbing energy from the unipolar bus may include supplying energy to and absorbing energy from the unipolar bus using an active filter comprising a switching power converter. In such embodiments, controlling the operation of the active filter may include controlling the active filter using an active filter controller of the inverter controller to deliver the substantially all of the time-varying power that is delivered to the AC grid. Additionally, in some embodiments, delivering power from the unipolar bus to the AC grid may include delivering power from the unipolar bus to the AC grid using an output converter comprising a switching power converter. In such embodiments, controlling the operation of the output converter comprises controlling the output converter using an output converter controller of the inverter controller to deliver power to the AC grid.

In some embodiments, controlling operation of the active filter may include controlling a time-varying current that flows in the active filter capacitor. In other embodiments, controlling operation of the active filter may include sensing the magnitude of the unipolar bus voltage and controlling the current in the active filter to reduce the ripple across the unipolar bus towards zero. Additionally, in some embodiments, controlling the output converter may include controlling the magnitude of the current delivered by the output converter to the AC grid so that the average power delivered to the grid by the output converter is substantially equal to the power delivered by the unipolar source less the substantial total of the power losses in the inverter. Further, in some embodiments, regulating the unipolar bus voltage may include sensing the magnitude of the unipolar bus voltage and controlling the magnitude of the current delivered by the output converter to the AC grid to maintain the average value of the unipolar bus voltage at the first pre-determined value.

The method may also include providing a second pre-determined value for an average value of the voltage across the active filter capacitor, comparing the average value of the unipolar bus voltage to the first pre-determined value, and, based upon the comparison, controlling the current in the active filter capacitor to alter the average value of the voltage across the active filter capacitor, and controlling the magnitude of the current delivered by the output converter to the AC grid to maintain the average value of the voltage across the active filter capacitor at the second pre-determined value. Additionally, in some embodiments, delivering a pre-determined amount of power from the unipolar input source may include delivering a pre-determined amount of power from a photovoltaic cell. In such embodiments, the method may further include determining the pre-determined amount of power using a maximum-power-point-tracking ("MPPT") controller and generating a power command indicative of the pre-determined amount of power and an input current command indicative of the current to be delivered by the photovoltaic cell current.

The method may further include controlling the current drawn from the photovoltaic cell by the input converter to be substantially equal to the input current command Additionally, the method may include providing to the output converter controller: a value indicative of the pre-determined amount of power, $P_S$; a measurement of the rms grid voltage, $V_L$; a measurement of the grid phase, $\theta$; and a pre-determined setpoint value of a power factor angle, $\phi$. In such embodiments, controlling the output converter comprises controlling the current delivered by the output converter to the AC grid to comprise a time-varying component essentially equal to: $i_{LFF}(t)=(sqrt(2) \cdot P_S/V_L) \cdot (\cos(\theta+\phi)/\cos(\phi))$. The method may also include providing to the output converter controller: a measurement of the average voltage across the active filter capacitor, $v_{CAFA}$, and a second pre-determined value indicative of a desired average value of the voltage across the active filter capacitor, $V_{CAFS}$. In such embodiments, controlling the output converter may include controlling the current delivered by the output converter to the AC grid to comprise an additional time-varying component, which, when combined with $i_{LFF}(t)$, causes $V_{CAFA}$ to be essentially equal to $V_{CAFS}$.

According to yet a further aspect, a method for improving efficiency in an inverter, which is configured to deliver power from a unipolar input source to an alternating-current ("AC") grid at a grid voltage and grid phase and that operates in accordance with the method described above, may include connecting the active filter directly to the unipolar bus.

DESCRIPTION OF THE DRAWINGS

FIGS. 12A through 12D is a schematic illustrating a simulation model of an inverter system according to the present disclosure;

DETAILED DESCRIPTION

Figure 1A:
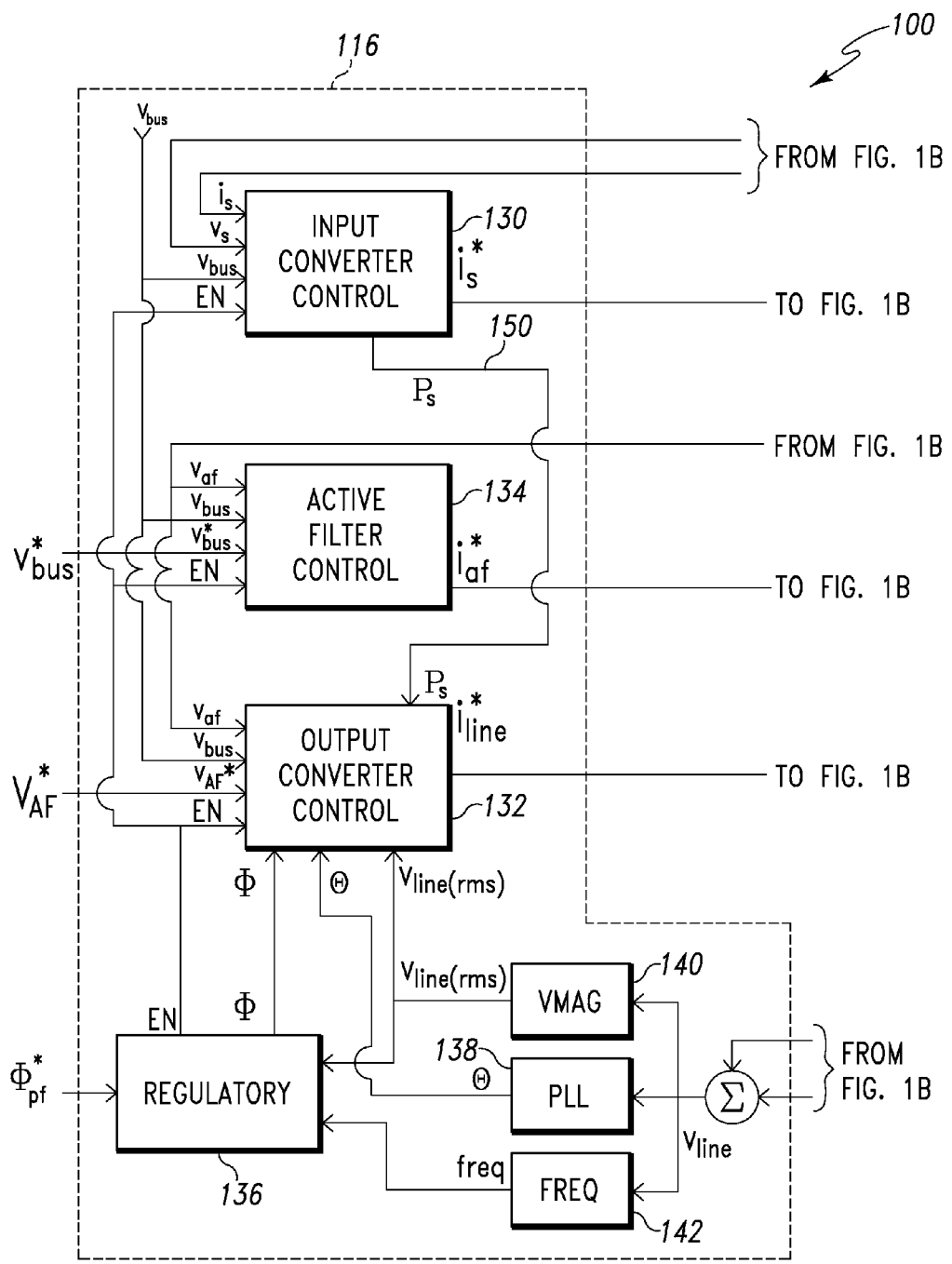
FIGS. 1A and 1B is a block diagram of one embodiment of an inverter according to the present disclosure.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Some embodiments of the disclosure, or portions thereof, may be implemented in hardware, firmware, software, or any combination thereof. Embodiments of the disclosure may also be implemented as instructions stored on a tangible, machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Photovoltaic power systems that supply AC power comprise solar panels for delivering DC power and one or more inverters for converting the solar panel power into AC current for delivery to the AC grid. The DC power delivered by a solar panel is a function of environmental variables, such as, e.g., sunlight intensity, sunlight angle of incidence and temperature.

Figure 1B:
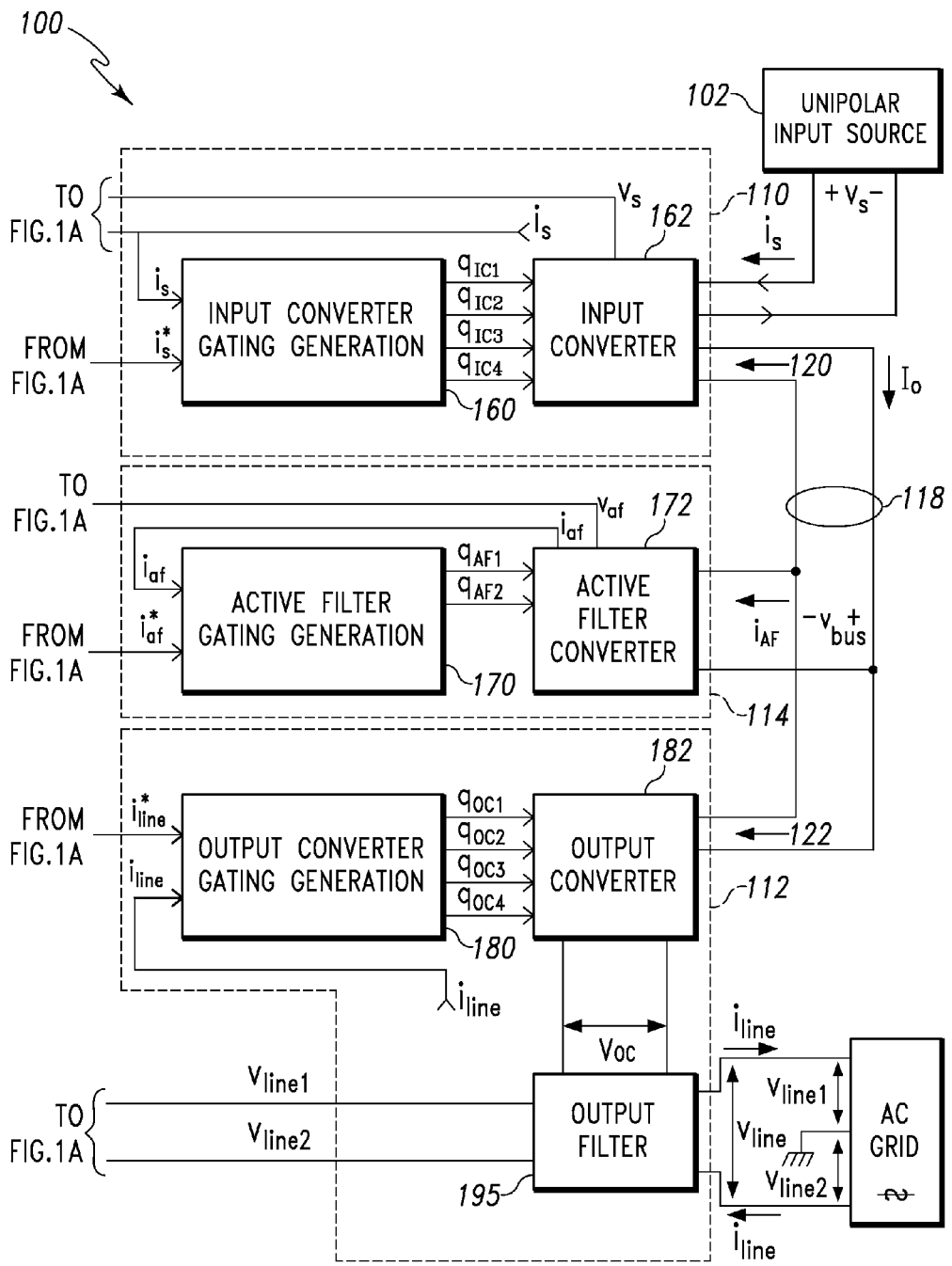

FIG. 1 shows a block diagram of an inverter 100 according to the present disclosure. The inverter is configured to control the delivery of power from a unipolar input source 102 (e.g., a DC source, a photovoltaic solar cell or module, a fuel cell) to an alternating-current ("AC") grid 104 and, in some embodiments, loads coupled to the AC grid 104. An example of an AC grid is the utility power grid that supplies utility AC power to residential and industrial users; such a grid is characterized by its essentially sinusoidal bipolar voltage (e.g. voltage Vline, FIG. 1) and a fixed grid frequency, f (e.g. $f=\omega/2\pi=50$ Hz or 60 Hz).

As shown in FIG. 1, the inverter 100 comprises an input current regulator 110, an output current regulator 112, an active filter 114, and an inverter controller 116. A unipolar bus 118, which is galvanically isolated from the unipolar input source, connects the output of the input converter 120 to the active filter 114 and to the input of the output converter 122. The inverter controller 116 comprises an input converter controller 130, an output converter controller 132 and an active filter controller 134. The inverter controller 116 may also comprise other elements, such as regulatory element 136 and PLL 138, as described below.

Input current regulator 110 is embodied as a current-controlled switching converter that receives an input current command $i_s^*$ and controls the average current drawn from the input source 102, $i_s$, to be substantially equal to the value indicated by the command value $i_s^*$. With reference to FIG. 1, input current regulator 110 comprises converter gating generation circuitry 160 and a switching input converter 162. Converter gating generation circuitry 160 compares a measured value of the current $i_s$ to the input current command $i_s^*$, and, by means of switch control signals 1c1-q1c4, adjusts the relative timing of switches in the input converter 162 in order to adjust the current $i_s$ delivered by the converter to be substantially equal to the value indicated by $i_s^*$.

Figure 2:
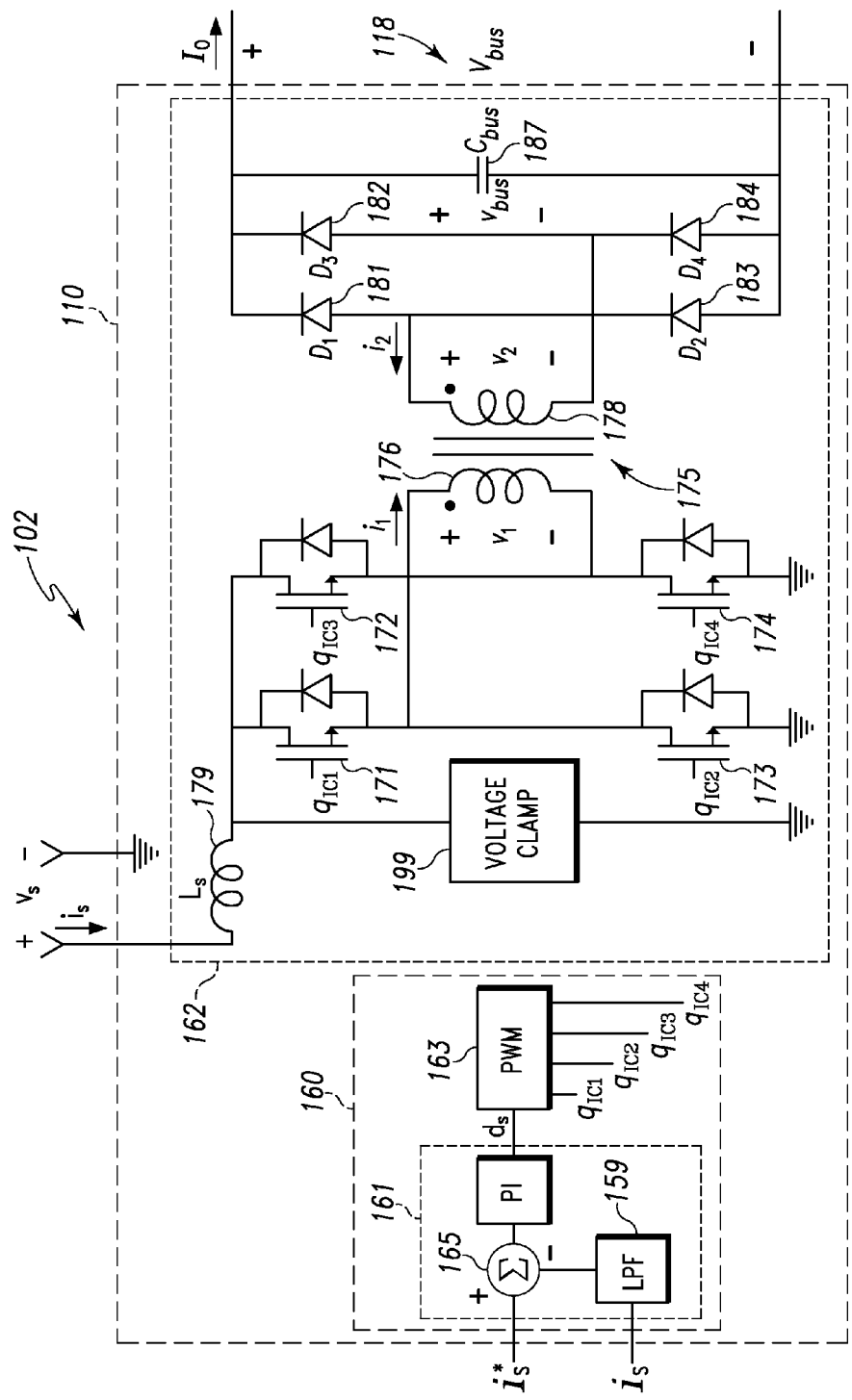
FIG. 2 is a schematic of an embodiment of an input current regulator of the inverter of FIG. 1.

An example of an input current regulator 110 is shown in FIG. 2. In FIG. 2, an isolated boost switching converter 162 receives power from the unipolar input source 102 at voltage $V_s$ and current $i_s$. Gating generator circuitry 160 may comprise a proportional-integral ("PI") feedback controller 161 and a pulse-width modulation ("PWM") circuit 163. A low pass filter ("LPF") 159 in the feedback controller may remove switching noise and other high frequency artifacts from a measured value of $i_s$ which is compared to input current command $i_s^*$ at differencing junction 165. Based upon the comparison, the feedback controller 161 adjusts its output signal, ds, which is delivers to PWM generator 163. Based upon the received value of ds, the PWM generator 163 controls the relative timing of the switches 171-174 in the converter 162 to adjust the power delivered, and hence the current $i_s$ drawn, by the converter 162. By this process, the average current drawn by the converter 162 from the input source 102, $i_s$, may be regulated to be substantially equal to the current command $i_s^*$.

The converter 162, comprising input inductor 179, voltage clamp 199, and transformer 175, is one of several possible current-fed converter topologies. The voltage clamp 199 clamps the voltage applied to the bridge circuit formed by the switches 171-174. The voltage clamp 199 may be embodied as a passive or active circuit. For example, in embodiments wherein the voltage clamp 199 is a passive circuit, a parallel diode and RC circuit may be used. The illustrative transformer 175, comprising primary winding 176 and secondary winding 178, provides galvanic isolation between the primary side converter circuitry (including input source 102) and the secondary side circuitry (including unipolar bus 118). The turn ratio of the transformer may also provide voltage and current transformation between the input source and the unipolar bus. The switches are turned on and off by the PWM circuitry 163 at a relatively high switching frequency (e.g., at a frequency that is substantially higher than the AC grid frequency). Power is transferred to the output of the inverter 100 (e.g. to unipolar output bus 118) via isolation transformer 175 and rectifiers 181-184. A filter capacitor 187 may be included to provide energy storage and filtering.

With reference to FIG. 1, the output current regulator 112 is embodied as a current-controlled switching converter that receives an output current command $i_{line}^*$ and controls the magnitude of the AC current delivered to the AC grid, $i_{line}$, to be substantially equal to the value indicated by the command value $i_{line}^*$. The output current regulator 112 illustratively comprises converter gating generation circuitry 180 and switching output converter 182.

Figure 3:
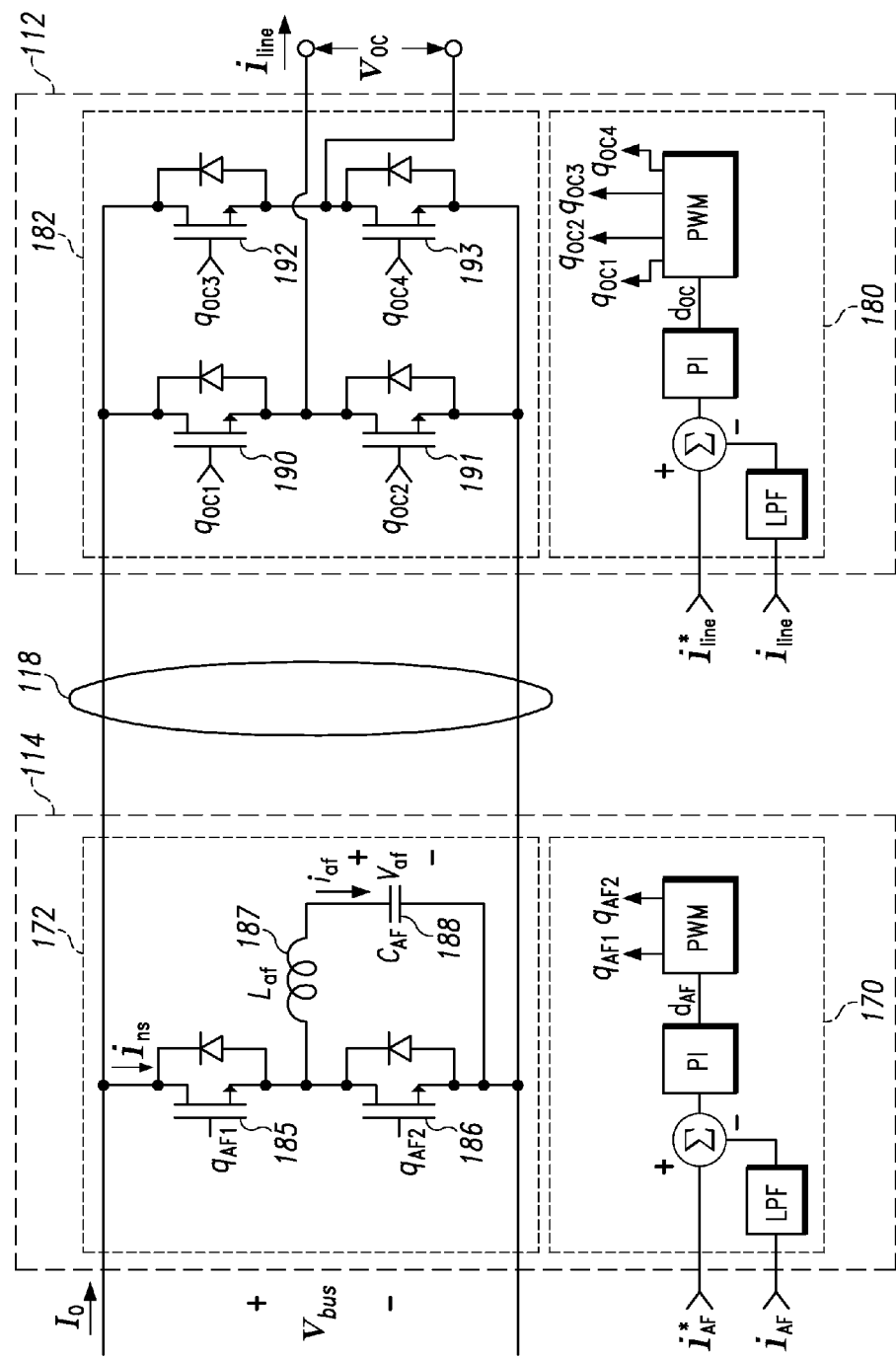
FIG. 3 is a schematic of embodiments of an active filter and an output current regulator of the inverter of FIG. 1.
Figure 4:
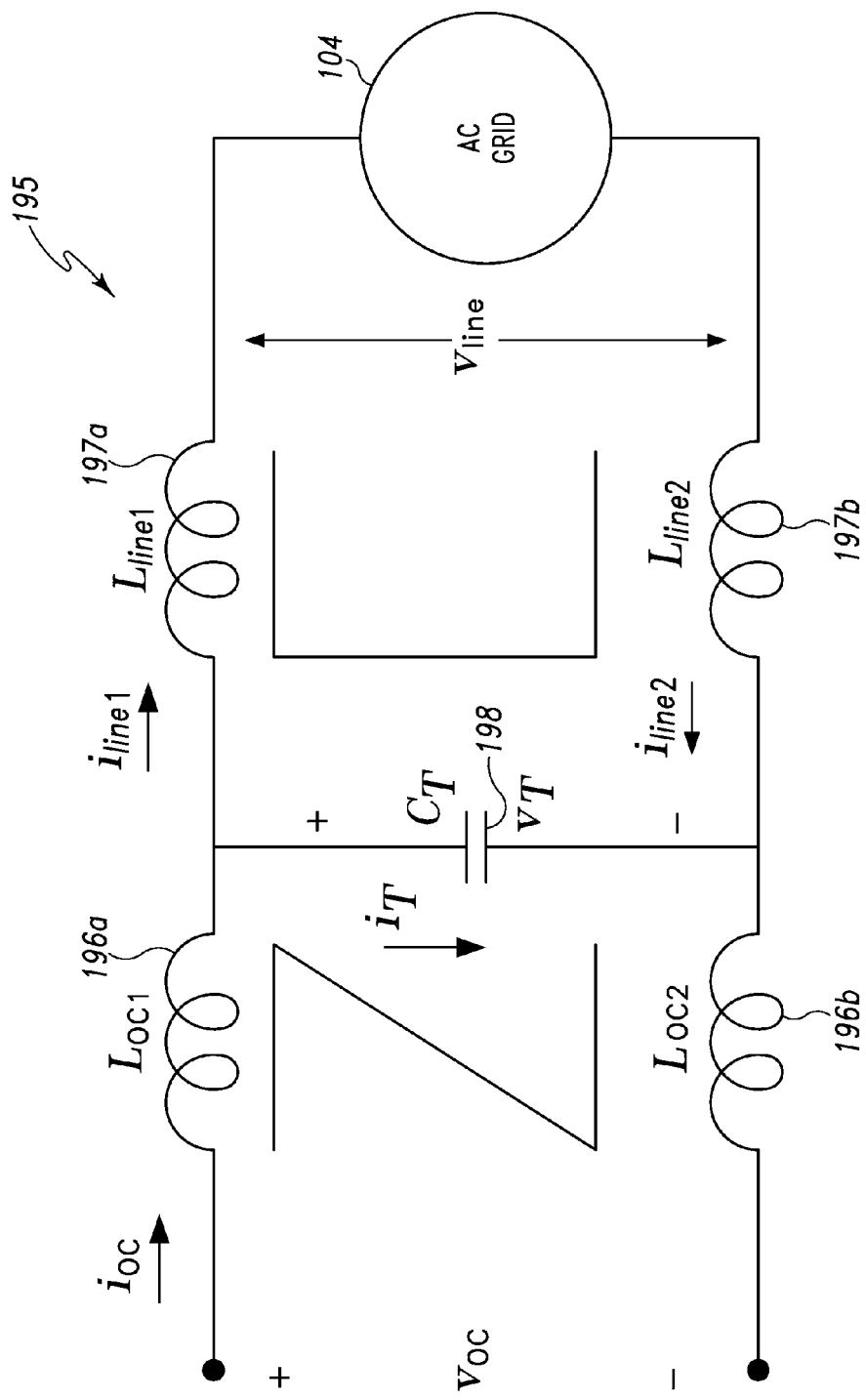
FIG. 4 is a schematic of an embodiment of an output filter of the inverter of FIG. 1.

An example of an output current regulator 182 is shown in FIG. 3. In FIG. 3, the output converter 182 is embodied as a non-isolated full-bridge switching converter, comprising switches 190-193, that are controlled by output converter gating generator 180 to deliver the current indicated by the command value $i_{line}^*$. The full-bridge configuration enables the output converter to deliver a bipolar voltage, $v_{oc}$, and bipolar current $i_{line}$. Control, by gating generator 180, of the current delivered by output regulator 112, may be similar to that described above for the input converter shown in FIG. 2. An output filter 195, shown in FIGS. 1 and 4, may be interposed between the output of the output converter 182 and the AC grid 104, to filter the voltage $v_{oc}$ as a means of reducing conducted interference and satisfying regulatory requirements. As shown in FIG. 4, the filter 195 may comprise differential-mode inductors, $L_{OC1}$ 196a and $L_{OC2}$ 196b, a common-mode inductor $L_{line1}$-$L_{line2}$ 197a, 197b, and line filter capacitor $C_T$ 198.

Active filter 114 is embodied as a current-controlled switching converter that supplies energy to or absorbs energy from the unipolar bus 118, as explained below, in order to supply time-varying components of the power delivered by the output converter 182 to the AC grid 104. Use of the active filter 114 is intended to reduce or eliminate the amount of time-varying power that must be provided by the input source 102. Active filter 114 receives an active filter current command $i_{af}^*$ and controls the magnitude of the AC current in the active filter, $i_{af}$, to be essentially equal to the value indicated by the command value $i_{af}^*$.

An example of an active filter 114 is shown in FIG. 3. In FIG. 3, the active filter converter 172 illustratively comprises a half-bridge switching converter, comprising switches 185, 186, that are controlled by active filter gating generator 170 to control the current flowing in the active filter capacitor, $i_{af}$, to be essentially equal to the value indicated by the command value $i_{af}^*$. The switches control the charging and discharging of active filter capacitor $C_{AF}$ 188; an active filter inductor $L_{af}$ is provided in series with $C_{AF}$ to smooth the flow of current, $i_{af}$, in the capacitor. Control of the active filter converter 172 by gating generator 170 may be similar to that described above for the input converter shown in FIG. 2.

By placing the active filter across the unipolar bus 118, instead of across the unipolar input source (or elsewhere in the primary-side circuitry of input regulator 110), the power processed by the active filter need not be processed by the input converter 162 and passed through the transformer 175. This simplifies the design of the power transformer (e.g. a two-winding transfer may be used) and may increase the operating efficiency of the inverter because the losses that would otherwise occur in the input converter associated with processing of the active filter power are reduced or eliminated.

Use of active filtering, to provide the time-varying component of the output power, may reduce the required value of energy storage capacitance by a factor of twenty (20) or more, allowing cost-effective use of reliable capacitor technologies (e.g., film capacitors) in both the active filter (e.g., capacitor $C_{AF}$ 188, FIG. 3) and in the output converter (e.g., filter capacitor $C_{bus}$ 187, FIG. 2). Placement of the active filter across the unipolar bus may also allow operation of the active filter at a relatively high voltage (e.g., 400 Volts, as opposed to a few tens of volts on the solar-cell side of the isolation transformer), which may further improve the power density, and reduce the size, of the active filter capacitor.

A feature of the inverter 100 is that the unipolar bus voltage is regulated to a pre-determined value $V_{bus}^*$. Regulating the unipolar bus voltage is intended to ensure that there is always enough voltage available to regulate the output current, $i_{line}$, thereby also ensuring continuous delivery of power without or with reduced high distortion. Regulation of $V_{bus}$ may also improve inverter reliability by ensuring that $V_{bus}$ remains within the range of the blocking capability of constituent power semiconductors. For example, in the case of MOSFETs, a 400-V bus voltage, $V_{bus}$, coupled with 650-V ratings on the semiconductors may result in a highly reliable design because the voltage operating margin of the MOSFETs is relatively high. Operating such MOSFETs at a higher bus voltage, or on a bus whose voltage is allowed to fluctuate to higher voltages, may significantly reduce inverter reliability.

In the remainder of the description that follows we assume that the unipolar input source 102 is a photovoltaic cell or module (collectively referred to herein as a "solar cell"); that the role of the inverter 100 is to regulate the power flow from the solar panel to the AC grid 104; that the delivery of power to the AC grid 1011 by the output converter 122 is by controlled delivery of a substantially sinusoidal current $i_{line}$ into the AC grid at the grid frequency; and that the converter topology is that illustrated in FIGS. 1 through 4. However, such assumptions are for the clarity of the description only. It should be appreciated that in other embodiments, other topologies and control methodologies may be used.

Referring to FIG. 1, the inverter controller 116 provides supervisory control of the input current regulator 110, the output current regulator 112 and the active filter 114. That is, the inverter controller delivers current commands to the regulators. The input current regulator receives the current command $i_s^*$ from the input converter controller 130; the output current regulator receives the current command $i_{line}^*$ from the output converter controller 132; and the active filter receives the current command $i_{af}^*$ from the active filter controller 134. In addition, each of the regulators receive measured signals (i.e., signals indicative of the measured values of voltages, currents, or power levels): the input current regulator receives the measured signal $i_s$, indicative of the value of the current, $i_s$, drawn by the input converter 162; the output current regulator receives the measured signal $i_{line}$, indicative of the value of the actual current, $i_{line}$, delivered to the AC grid 104 by the output converter 182 (via output filter 195); and the active filter 114 receives the measured signal $i_{af}$, indicative of the value of the current, $i_{af}$, flowing in the active filter capacitor 188. Use of the same symbols for both actual and measured signals is for ease of discussion. The measured signals may be scaled, level-shifted, filtered, or isolated by known means as needed and it may also be assumed that power signals may be calculated from voltage and current signals in their respective blocks. Furthermore, the fundamental and/or RMS value of the line voltage, $v_{line}$, as well as its phase angle, $\theta$, may be determined by known means (e.g., as indicated by in FIG. 1 by VMAG block 140 and phase-locked loop (PLL) block 138).

As previously described, the gating generators 160, 170, 180 within each regulator block compare measured current to commanded current and generate the switch timing and gating logic for their respective switching power converters 162, 172, 182. Although specific embodiments of the input converter, output converter and active filter have been described and illustrated (FIGS. 2 and 3), it is understood that the regulators may be implemented in a number of ways and controlled using conventional methods, such as average current mode control, hysteresis current control, or any current-regulated voltage-source inverter control. A system-level requirement for these regulators may be that they respond to current commands with an effective bandwidth much greater than the line frequency and its lower harmonics. This will generally be true for switching frequencies at or above 10 kHz and reasonable bandwidth limits on the current regulators.

In addition to measured values, certain pre-determined command values are delivered to the inverter controller 116, as shown in FIG. 1. One command value is the commanded unipolar bus voltage, $V_{bus}^*$, which indicates a pre-determined value of $V_{bus}$ that is sufficiently high to power the output regulator and active filter. The pre-determined value of $V_{bus}$ may be a constant value (e.g., 400 VDC) or it may be a value that is a function of one or more other variables (e.g., $V_{bus}$ may be a function of AC grid voltage—if the grid voltage is relatively low, e.g., 200 VAC instead of 240 VAC, the value of $V_{bus}$ may be reduced, e.g., to 360 VDC instead of 400 VDC, which may reduce losses in the converter). Another pre-determined command value is the voltage, $V_{AF}^*$, which is the desired average value of the voltage on active filter capacitor $C_{AF}$ 188. The average value of this voltage is regulated so that the capacitor voltage doesn't "walk" toward one rail (because the active filter is intended to be lossless, there is no load to dispose of a DC offset current that might cause $C_{AF}$ to charge or discharge undesirably). Another pre-determined command value is the power factor angle, $\phi_{pf}$. The power factor angle commands the phase shift of the line current with respect to the line voltage. One reason to vary the phase shift away from zero may be to supply reactive power to the grid for purposes of providing ancillary services; another reason may be to implement "anti-islanding" protection, a consideration in contemporary inverters—varying $\phi_{pf}$ may enable the controller to sense certain resonant conditions that might otherwise not be detected by other island detection algorithms Referring to FIG. 1, one embodiment of an inverter control strategy features simultaneous control of input current $i_s$, output current $i_{line}$, active filter current $i_{ac}$, and unipolar bus 118 voltage, $v_{bus}$. As discussed above, the input regulator 110 is controlled by the input converter controller 130 to deliver an essentially constant amount of power, Po, to the unipolar bus. A measurement of this power is communicated to the output converter controller 132 which controls the output regulator 112 to deliver a corresponding amount of average power to the AC grid 104 at the grid frequency, $f=\omega/(2\cdot\pi)$. Assuming ideal sinusoidal waveforms for both the grid voltage, $V_{line}$, and the current, $i_{line}$, the power delivered to the grid by the output converter, p(t), comprises both an average power component, equal to Po (assuming no losses), and a time-varying component at twice the grid frequency:

$$p(t)=Po+Po^*\cos(2\omega t) \quad (2)$$

It is understood that Equation 2 is for the ideal case of perfectly sinusoidal grid voltage and current. In practice, AC grid voltages are generally not perfectly sinusoidal and therefore both the grid voltage and the time-varying power p(t) may contain higher order harmonics of the grid frequency. As the output converter 182 delivers this time-varying power to the AC grid, the active filter controller 134 controls the active filter 114 to supply energy to and absorb energy from the unipolar bus so that essentially all of the time-varying component of p(t) is supplied by the active filter 172, thereby enabling the solar cell to operate at an essentially constant power point, Po. Use of the active filter to supply the time-varying power may also reduce the voltage ripple on the unipolar bus 118. Another feature of the controller 116 is that it regulates the unipolar bus voltage, $V_{bus}$, to an essentially constant value.

Figure 5:
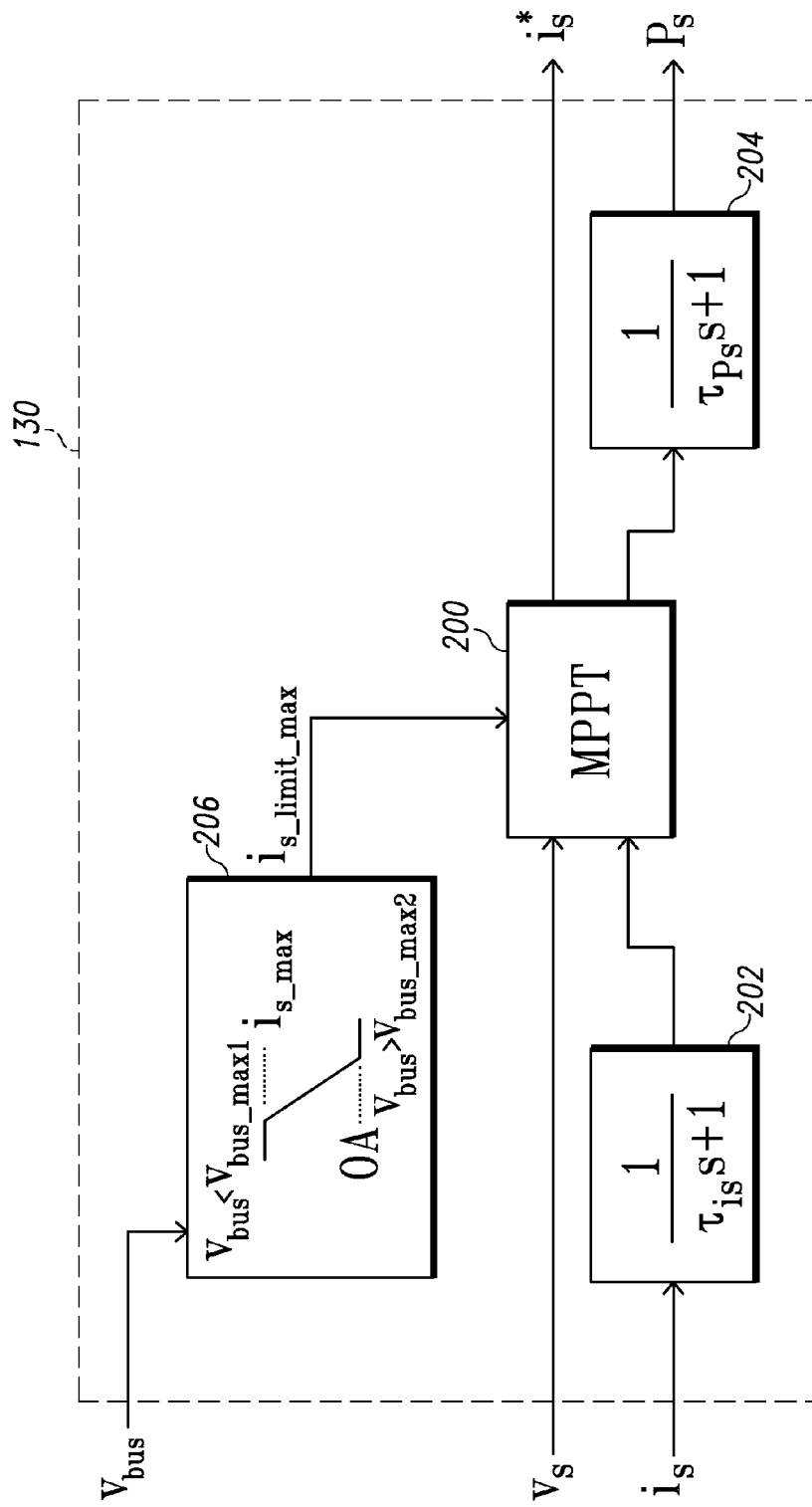
FIG. 5 is a block diagram of an input current controller of the inverter of FIG. 1.

A block diagram of one embodiment of an input current controller 130 for use in an inverter according to the present disclosure is shown in FIG. 5. A low pass filter 202 (e.g., single pole rolloff at 1 KHz) removes switching noise from a measured value of the solar cell current, $i_s$, which, along with a measured value of the solar cell voltage, $v_s$, is delivered to an MPPT controller 200. The MPPT controller (which may operate in accordance with any one of a number of known MPPT algorithms (see, e.g., U.S. Patent Publication No. 2008/018338, entitled "Ripple Correlation Control Based on Limited Sampling" by Jonathan W. Kimball et al.) establishes the maximum power point, Ps, for the solar cell and calculates and delivers both the corresponding input current command $i_s^* = Ps/v_s$ and the value of $Ps = v_s \cdot i_s^*$. The current command $i_s^*$ is passed to the input current regulator 110 and sets the value of current which input converter 162 is controlled to draw from the solar cell 102. The value of Ps is passed through a low pass filter 204 (e.g., single pole rolloff at 1 KHz) and delivered to the output converter controller 132 for use in setting a command value for the current, $i_{line}$, as explained below. The input current controller 130 may also comprise a current limiting circuit 206 that may, depending on the value of the unipolar bus voltage, $V_{bus}$, set an upper limit, $i_{s\_limit\_max}$, on the value of $i_s^*$. As shown in FIG. 5, if $V_{bus}$ is below a pre-determined value, $V_{bus\_max1}$ (e.g., 450V), the current command is limited only by the solar cell's maximum allowable operating current $i_{s\_max}$. As $V_{bus}$ rises above $V_{bus\_max1}$, however, the value of $i_s^*$ is progressively reduced until, at a bus voltage at or above $V_{bus\_max2}$ (e.g. 500V) it is reduced to zero. By this means, power delivered by the input converter is throttled back if the unipolar bus voltage rises above a defined limit, which might occur, for example, in the event of a rapid change in load or a grid fault.

Figure 6:
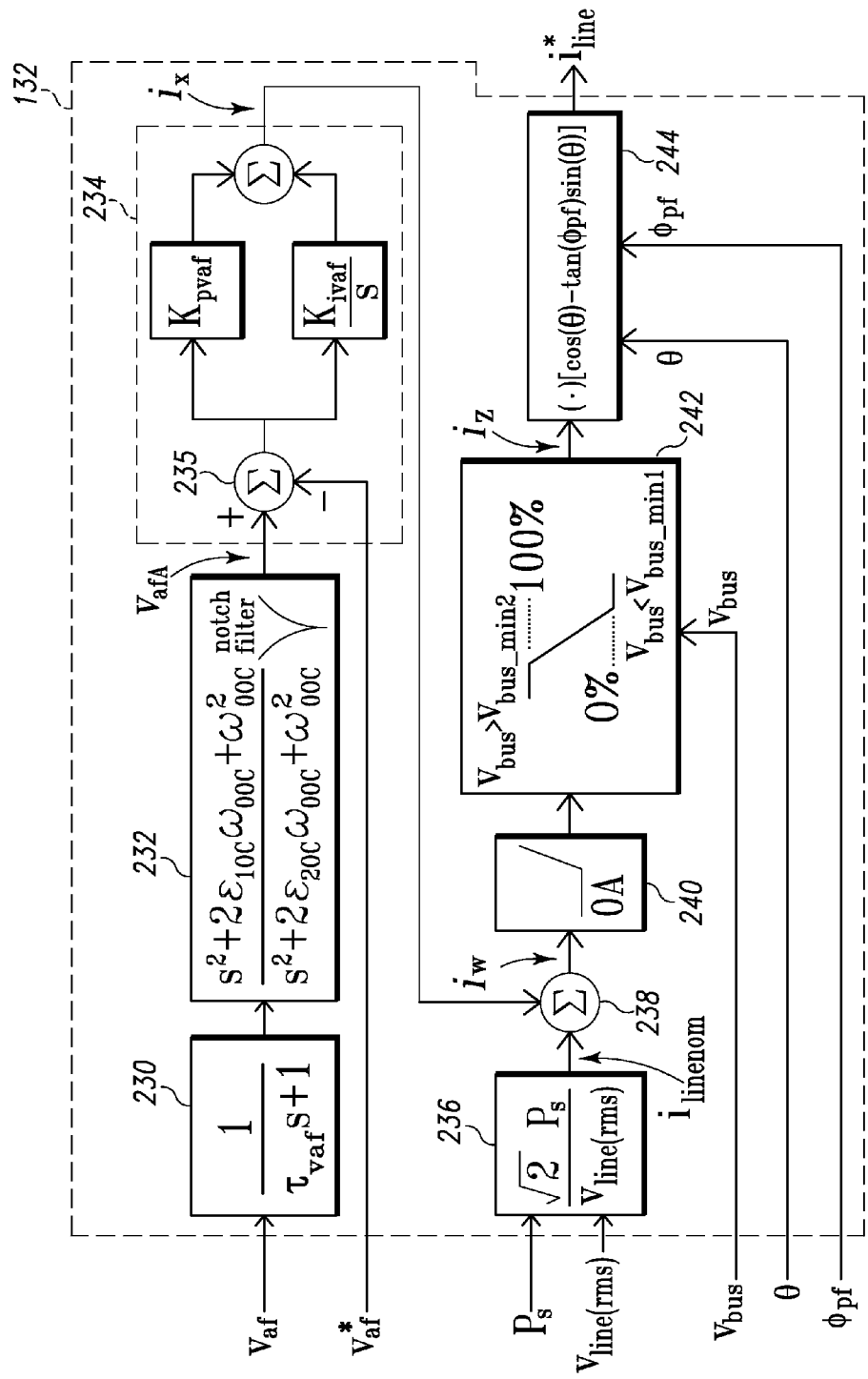
FIG. 6 is a block diagram of an output current controller of the inverter of FIG. 1.

A block diagram of one embodiment of an output converter controller 132 for use in an inverter according to the present disclosure is shown in FIG. 6. The output converter controller 132 controls the magnitude and phase of the sinusoidal AC current, $i_{line}$, that is delivered to the AC grid and also controls the average value of the voltage across the active filter capacitor ($C_{AF}$, FIG. 3). The controller 132 receives measured values of the active filter capacitor voltage $v_{af}$, the unipolar bus voltage $v_{bus}$, the AC grid line voltage $V_{line(rms)}$ (from line voltage calculator block VMAG, FIG. 1), and the phase of the AC grid, $\theta$ (from PLL 138, FIG. 1). Controller 132 also receives commanded values for the average value of the active filter capacitor voltage, $V_{af}^*$, the power factor angle $\phi_{pf}$, and the value of solar cell power, Ps, received from input current controller 130 (FIG. 5). In an ideal system, $\theta = \omega t = 2\pi ft$ is considered to be a constant; in real systems, $\omega$ varies with time and the PLL must track this variation so that the phase of the current delivered to the AC grid is accurately synchronized to the phase of the grid voltage. Thus, the PLL 138 generates $\theta$ by tracking the actual phase of the line voltage (e.g., $\theta$ is the mathematical integral of the grid angular frequency $\omega$).

Filter blocks 230 and 232 extract the average value of the time-varying active filter capacitor voltage $v_{af}$. Filter block 230 is a low-pass filter (e.g. single pole rolloff at 6 Hz); filter block 232 is a notch filter with a sharp notch at twice the grid frequency. The two filter blocks 230, 232 remove substantially all of the time-varying components of $v_{af}$ and deliver a measured average value of the filter capacitor voltage, $v_{afA}$, to the input of PI feedback controller 234 (e.g., $K_{pvaf}=0.00375$ A/V; $K_{ivaf}=0.1$ A/V·s), where it is compared to the commanded value of the average value of the active filter capacitor voltage, $V_{af}^*$, by summing junction 235. Differences between the commanded average value and the measured average value of $v_{af}$ are reflected as variations in the signal output of the feedback controller, $i_x$, which is delivered as an input to summing junction 238. The other input of summing junction 238 is a calculated nominal value for the line current, $i_{linenom} = \text{sqrt}(2) \cdot Ps/V_{line(rms)}$, delivered by calculator block 236. $i_{linenom}$ represents the ideal value of line current, at zero power factor, that would result in the output power being equal to the input power. Summing junction 238 adds $i_x$ to $i_{linenom}$ to produce control signal $i_w$.

Ignoring, for the moment, the positive signal limiter 240 and the bus voltage limiter block 242, the signal $i_w$ is received at the input of sinusoidal signal generator 244 as the signal $i_z$.

The sinusoidal signal generator 244 generates the sinusoidal, time-varying output current command $i_{line}^*$:

$$i_{line}^* = i_z \cdot (\cos(\theta) - \tan(\phi_{pf}) \cdot \sin(\theta)) = i_z \cdot \cos(\theta + \phi_{pf})/\cos(\phi_{pf}) \quad (3)$$

$$i_{line}^* = i_{linenom} \cdot \cos(\theta + \phi_{pf})/\cos(\phi_{pf}) + i_x \cdot \cos(\theta + \phi_{pf})/\cos(\phi_{pf}) = iff(t) + ifb(t) \quad (4)$$

$i_{line}^*$ consists of two components, a feedforward component, $iff(t) = i_{linenom} \cdot \cos(\theta + \phi_{pf})/\cos(\phi_{pf})$, representing the ideal time-varying line current that would result in delivery of Ps watts to the AC grid at the power factor angle $\phi_{pf}$, and a feedback component, $ifb(t) = i_x \cdot \cos(\theta + \phi_{pf})/\cos(\phi_{pf})$, that is adjusted by feedback controller 234 to ensure that the output power and input power are balanced, as explained below.

In operation, the power delivered to the AC grid should be equal to the power delivered by the solar cell, less the total of circuit and other losses, else the unipolar bus voltage may go out of control. If too little power is delivered to the grid, the bus voltage will rise; if too much is delivered, the bus voltage will fall. Because the calculated nominal value of line current, $i_{linenom}$, is subject to measurement and calculation errors and cannot accurately account for the range of possible variations in circuit losses and other factors that affect power delivery, $i_{line}$ cannot be controlled by feedforward control alone.

During steady-state operation, a variation in the unipolar bus voltage, $V_{bus}$, resulting, e.g., from variations in power delivered by the output converter, will result in a variation in the average value of the filter capacitor voltage. For example, if the power delivered by the output stage is low relative to the power delivered by the input converter, both the unipolar bus voltage and the average value of the voltage across the active filter capacitor will tend to increase. This increase will cause the output of feedback controller 234, $i_x$, to increase, thereby increasing the magnitudes of $ifb(t)$ and $i_{line}^*$ (Equation 4) and increasing the power delivered to the AC grid. By this feedback process, the power delivered to the AC grid will be adjusted so that power flow from input to output is properly balanced and so that the average value of the voltage across the active filter capacitor is controlled to be at its commanded value, $V_{af}^*$.

Referring again to FIG. 6, bus voltage limiter block 242 provides attenuation in the magnitude of $i_{line}^*$ if the unipolar bus voltage, $V_{bus}$, drops below a pre-defined minimum value $V_{bus\_min2}$ (e.g., 350 V). If the bus voltage is at or above $V_{bus\_min2}$ there is no attenuation; for bus voltages between $V_{bus\_min2}$ and $V_{bus\_min1}$ (e.g., 300V) the magnitude of $i_{line}^*$ is progressively attenuated until, at voltages at or below $V_{bus\_min1}$, $i_{line}^*$ is reduced to zero. By this means, power delivered by the output converter is throttled back if the bus voltage falls below a defined limit, which might occur, for example, in the event of a sudden decrease in input power or a grid fault. Positive signal limiter 240 ensures that the command signal into sinusoidal signal generator 244 can never be negative.

Figure 7:
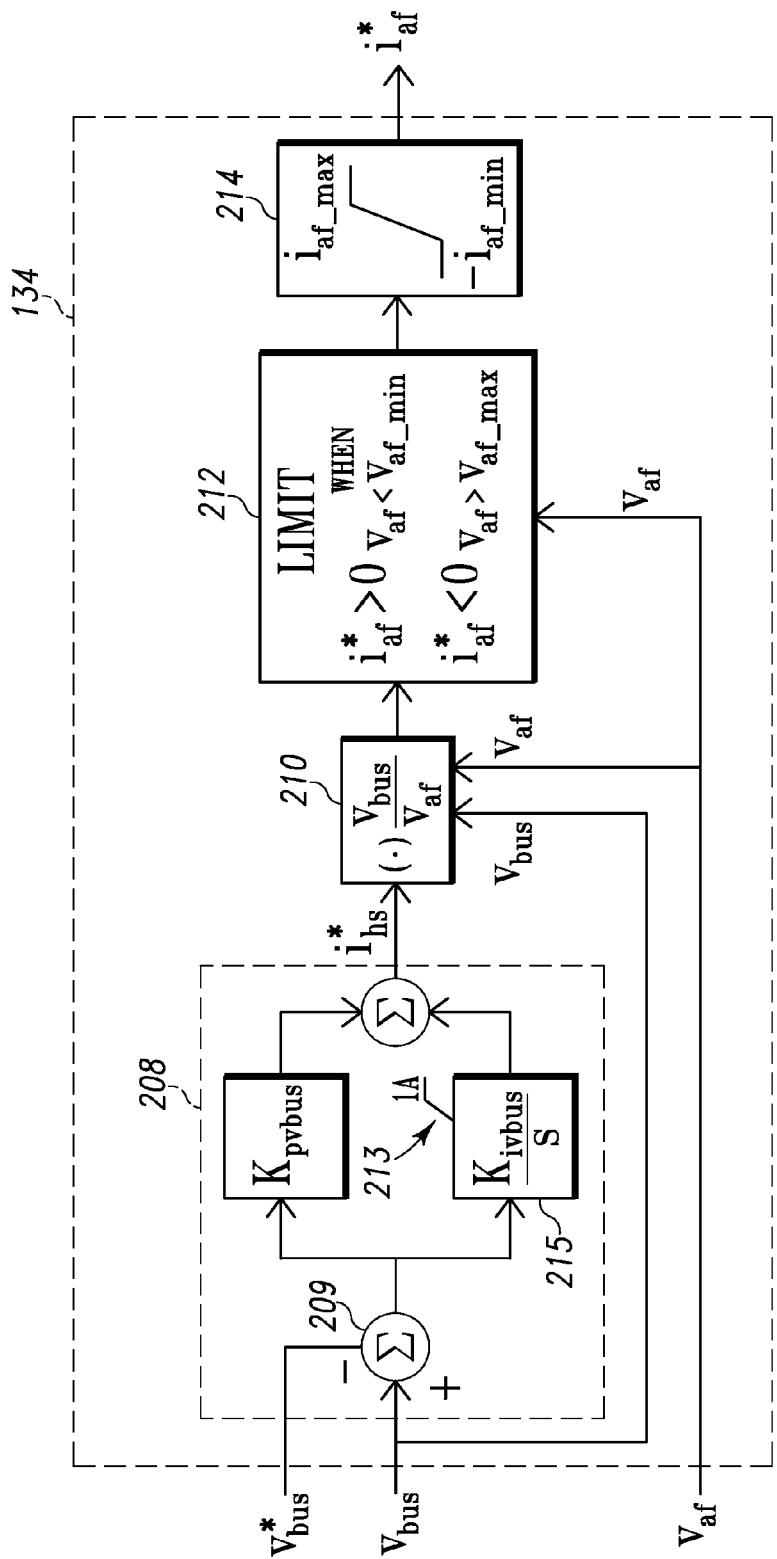
FIG. 7 is a block diagram of an active filter controller of the inverter of FIG. 1.

A block diagram of one embodiment of an active filter controller 134 for use in an inverter according to the present disclosure is shown in FIG. 7. The active filter controller 134 receives measured values of the unipolar bus voltage $V_{bus}$ and the time-varying active filter capacitor voltage $v_{af}$ and also receives the commanded value for the unipolar bus voltage $V_{bus}^*$. The active filter controller controls the current in the active filter capacitor, $i_{af}$, as a means of controlling the voltage ripple on the unipolar bus and also, in concert with the output voltage controller 132, controls the DC magnitude of the unipolar bus voltage.

Summing junction 209 in PI feedback controller 208 (e.g., $K_{pvbus}=0.04125$ A/V; $K_{ivbus}=259$ A/V·s) compares a measured value of $V_{bus}$ to the commanded value, $V_{bus}^*$, and produces a first error signal, $i_{hs}^*$, which is scaled, by scaling block 210, by a factor $V_{bus}/v_{af}$. The scaling factor is derived from the requirement that the power delivered by the capacitor be essentially equal to the power delivered to the unipolar bus:

$$V_{bus} \cdot i_{hs} = v_{af} \cdot i_{af} \quad (5)$$

where $i_{hs}$ (FIG. 3) is the current flowing into the active filter from the unipolar bus and $i_{af}$ is the current in the active filter capacitor 188. Therefore $i_{af} = (V_{bus}/V_{af}) \cdot h_{is}$. Ignoring, for the moment, limiter blocks 212 and 214, the output of scaling block 210 will be delivered to the active filter as the current command signal $i_{af}^*$.

Because the PI controller 208 receives a DC setpoint, it controls $i_{af}^*$ so that AC variations on the unipolar bus (e.g., ripple at the grid frequency and harmonics of the grid frequency) are driven towards zero. Because reflection of ripple power back into the solar cell would cause voltage ripple on the unipolar bus, controlling the active filter to cancel or reduce bus ripple requires that the active filter deliver substantially all of the time-varying power required by the output converter.

The active filter controller 132 also regulates the average value of the bus voltage $V_{bus}$. If, for example, the average value of $V_{bus}$ rises above the commanded value, $V_{bus}^*$, the PI controller will increase $i_{af}$, thereby also increasing the average voltage across the active filter capacitor, $v_{af}$. As discussed previously, the output current controller (132, FIG. 6) will respond to an increase in the average value of $v_{af}$ by increasing the line current, $i_{line}$, which will, in turn, cause a compensating reduction in $V_{bus}$.

Limit block 212 prevents the capacitor voltage from exceeding maximum and minimum voltage limits. If the voltage $v_{af}$ increases above an upper limit $V_{af\_max}$ (e.g. 450V) the limiter will force $i_{af}^*$ to be negative, supplying energy to the unipolar bus and reducing $v_{af}$, until $v_{af}$ drops back below the upper limit; if the voltage $v_{af}$ decreases below a lower limit $V_{af\_mm}$ (e.g., 50V) the limiter will force $i_{af}^*$ to always be positive, withdrawing energy from the unipolar bus and increasing $v_{af}$, until $v_{af}$ comes back above the lower limit. Limiter block sets maximum and minimum limits (e.g. +3A, −3A) on the commanded active filter current to reduce the possibility of excessive filter capacitor current causing the capacitor voltage $v_{af}$ to exceed the maximum and minimum operating voltage limits of the filter (e.g., $V_{bus}$ and zero). Also shown in FIG. 7, a windup limit 213 (e.g. 1A) is imposed on the maximum value that can be output by the integrator in the PI controller 208.

Maintaining the active filter capacitor voltage, $v_{af}$, at an appropriate average value, $V_{AF}$, improves operation of the inverter. Ignoring switching artifacts, the active filter capacitor voltage $v_{af}$ comprises a DC component, $V_{AF}$, and an AC component having a peak-to-peak variation that increases with increasing inverter output power. Because the active filter (172, FIG. 3) comprises a half-bridge converter, the controllable operating range of the active filter capacitor voltage lies between zero volts and $V_{bus}$. Thus, both the capacitor value, $C_{AF}$, and the average voltage, $v_{AF}$, may be selected to be consistent with delivering full inverter output power while maintaining the peak-to-peak variation of $v_{af}$ within the controllable voltage operating range.

FIGS. 8 through 11 show simulated waveforms illustrating the effects of average capacitor voltage on inverter performance. FIGS. 8-11 illustrate wave forms of a converter comprising the conversion circuits shown in FIGS. 2 through 7. In the FIGS. 8-11, the active filter capacitor value is $C_{AF}=10 \mu F$ and the average value of the unipolar bus voltage $V_{bus}^*=400$ V. The simulations were performed using an averaging model for the converter, so switching waveforms and noise are not present.

Figure 8A:
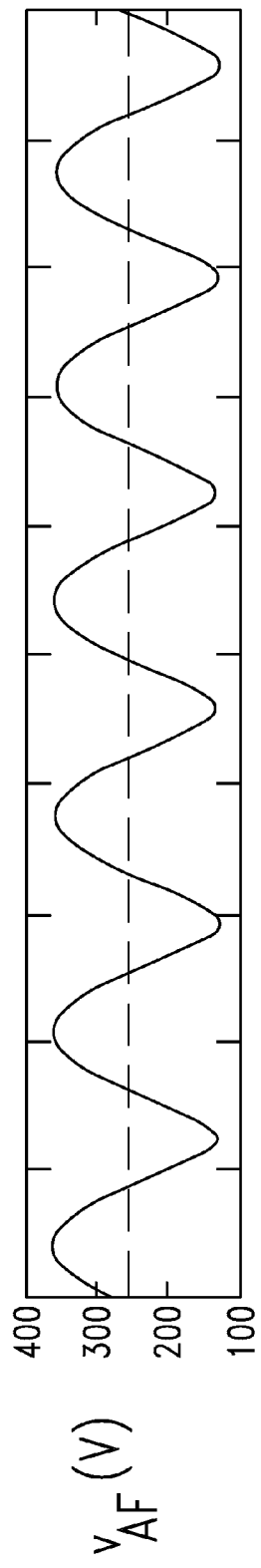
FIGS. 8A, 8B, 9A, 9B, 10A, 10B, 11A, and 11B illustrate simulated inverter waveforms of various circuits of the inverter of FIG. 1.
Figure 8B:
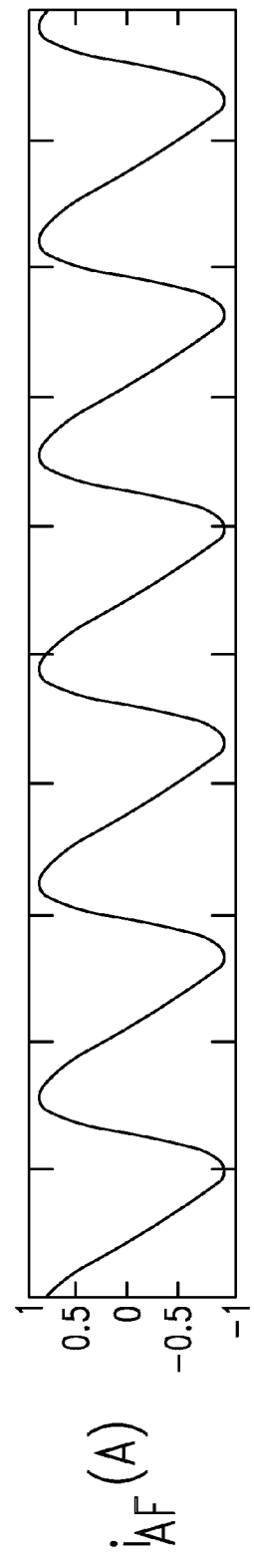
Figure 9A:
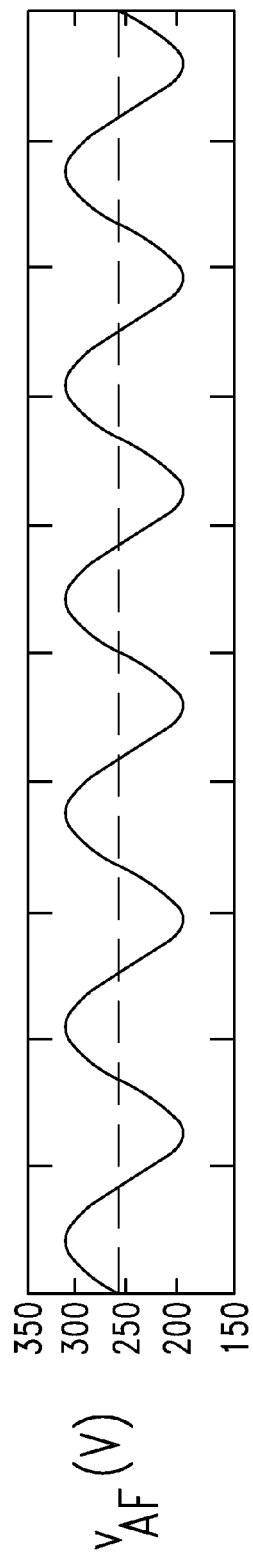
Figure 9B:
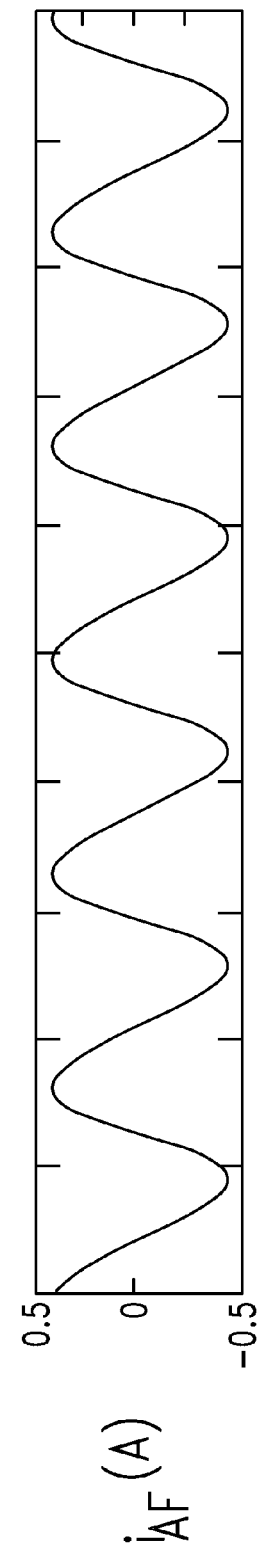
Figure 10A:
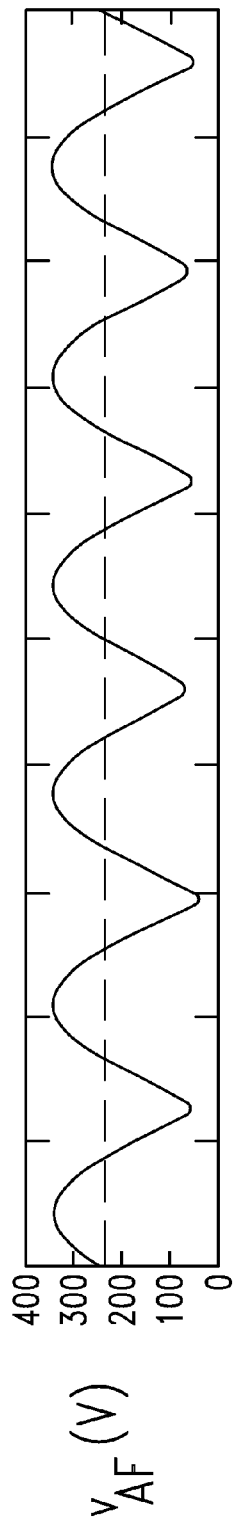
Figure 10B:
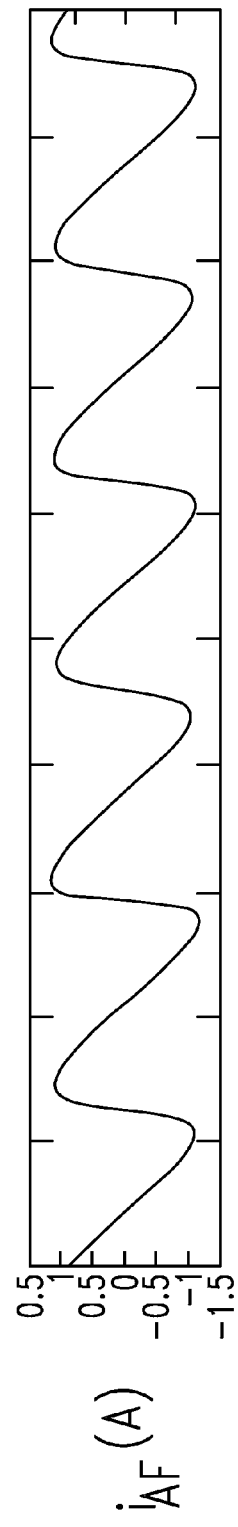
Figure 11A:
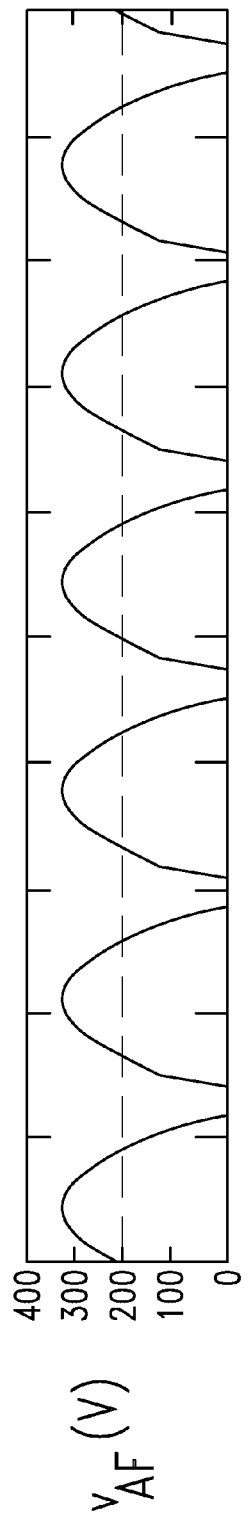
Figure 11B:
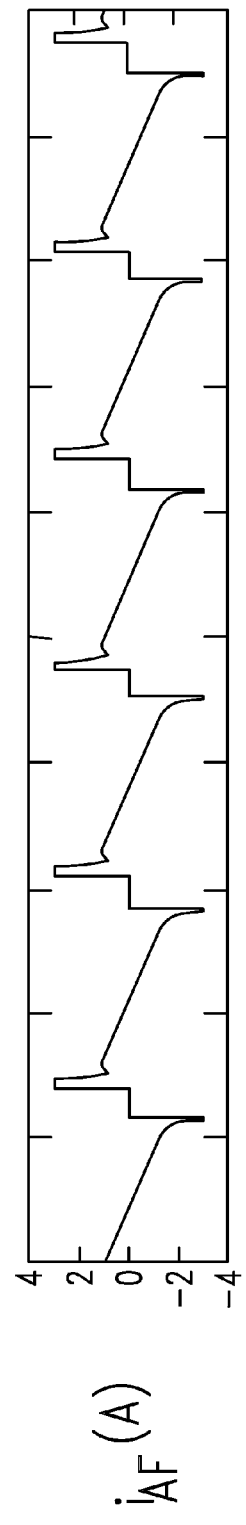

FIGS. 8A, 9A, 10A and 11A show the voltage across the active filter capacitor, $v_{af}$; FIGS. 8B, 9B, 10B and 11B show the active filter capacitor current $i_{af}$. FIGS. 8A and 8B show waveforms for an inverter operating with an average filter capacitor voltage $V_{AF}=260V$ and at full rated power, Ps=210 Watts; FIGS. 9A and 9B show waveforms for an inverter operating with an average filter capacitor voltage $V_{AF}=260V$ and with Ps=105 Watts; FIGS. 10A and 10B show waveforms for an inverter operating with an average filter capacitor voltage $V_{AF}=225V$ and with Ps=210 Watts; and FIGS. 11A and 11B show waveforms for an inverter operating with an average filter capacitor voltage $V_{AF}=200V$ and with Ps=210 Watts.

FIGS. 8 and 9 show waveforms for an inverter in which the average value of the active filter capacitor voltage (260V) has been selected to be approximately at the midpoint in energy between the maximum capacitor operating voltage (approximately 350V, FIG. 8A) and the minimum capacitor operating voltage (approximately 150V, FIG. 8A). The waveforms are smooth and well-behaved, both at full power (FIG. 8) and at half power (FIG. 9). FIG. 9 shows that the peak-to-peak variations in both the active filter voltage and current decrease with decreasing inverter output power.

FIG. 10 shows waveforms for an inverter in which the average value of the active filter capacitor voltage (225V) is lower than that in the converter of FIGS. 8 and 9. The active filter voltage (FIG. 10A) is approaching a rectified sine wave and is on the verge of clipping, approaching within approximately 50V of both its lower and upper operating voltage limits; the active filter capacitor current (FIG. 10B) is exhibiting rapid rates of change, owing to the rapid change in slope around the minimum voltage peak of the voltage waveform. Sharp discontinuities of this kind may result in reduced control performance, causing both an increase in the power reflected back into the solar cell and an increase in distortion in the current delivered to the AC grid.

In FIG. 11, the average value of the active filter capacitor voltage (200V) has been further reduced. The active filter capacitor voltage (FIG. 8A) is clipping and severe distortion is seen in the capacitor current (FIG. 8B). Operation in clipped mode will result in an increase in the power reflected back into the solar cell and an increase in distortion in the current delivered to the AC grid 104.

Providing sufficient active filter capacitor operating voltage margins (i.e., the difference between minimum and maximum capacitor operating voltages at full operating power and their respective operating limits (0V and $V_{bus}$, respectively)), as illustrated in FIGS. 8 through 11, may prevent clipping and reduce the maximum rate-of-change of the voltage across the active filter capacitor. The positive effects of increased voltage margins may include smoother waveforms and better control performance, as also illustrated in FIGS. 8 through 11. Increased voltage margins are, however, traded off against capacitor size and cost, since increased margins imply reduced energy storage. As a practical matter, however, sufficient voltage margins may ensure long-term reliability, because both the peak-to-peak variation, and the average value, of the voltage across the active filter capacitor are subject to variations arising from tolerances in the value of the active filter capacitor and other circuit components and voltages, and to variations owing to aging and thermal and other environmental and operating factors. As such, operating voltage margins sufficient to ensure predictable operating performance and low distortion over the full range of operating conditions and the full expected life of the inverter may be used.

Figure 15:
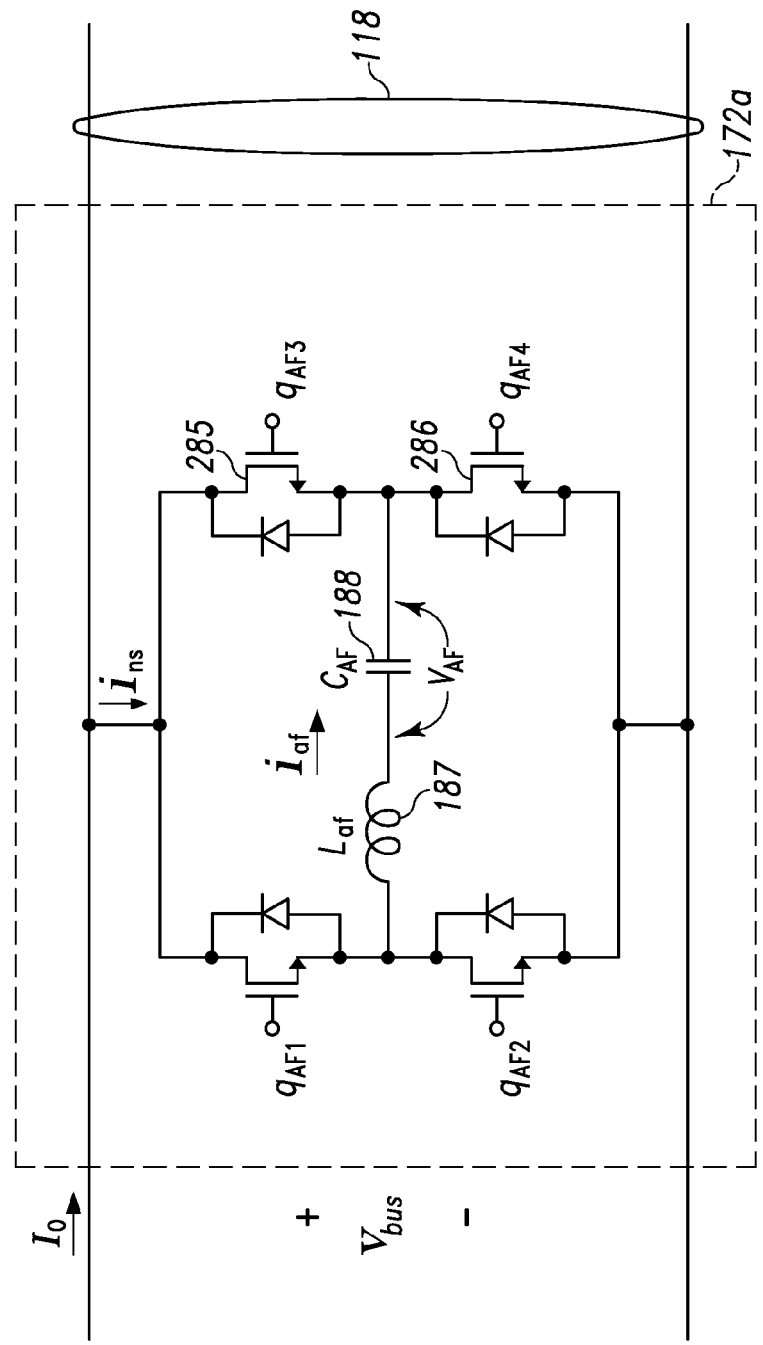
FIG. 15 illustrates another embodiment of an active filter of the inverter of FIG. 1.

In other embodiments, the active filter may, as shown in FIG. 15, be configured as a full-bridge switching converter 172a. A benefit of using a full-bridge configuration is the bipolar voltage across the active filter capacitor, which may have a more consistently sinusoidal waveform than the voltage in the half-bridge embodiment; a drawback is the increased cost associated with the additional switches 285, 286 and the more complex controller required to drive the additional switches (not shown in FIG. 15).

Figure 12A:
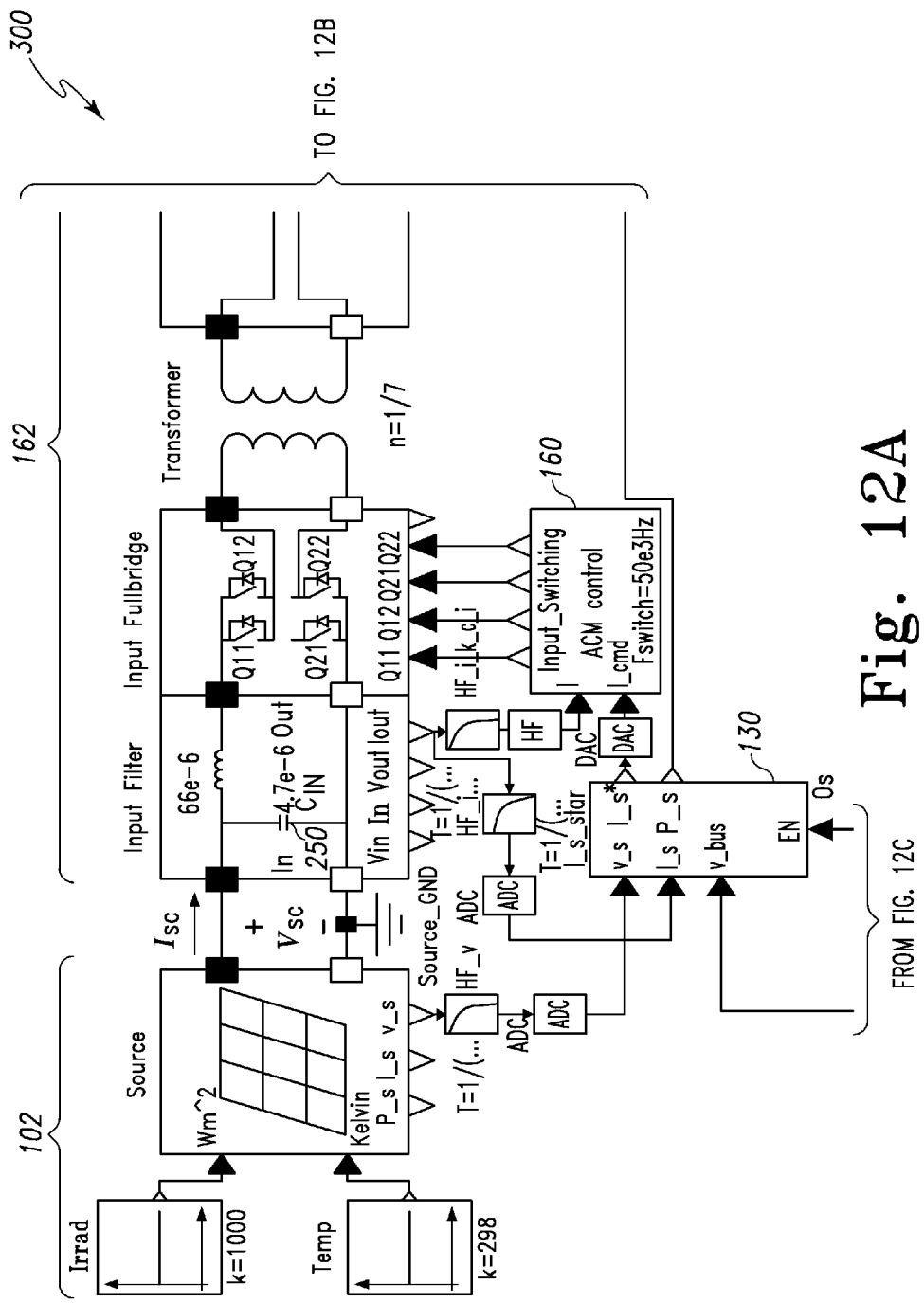
Figure 12B:
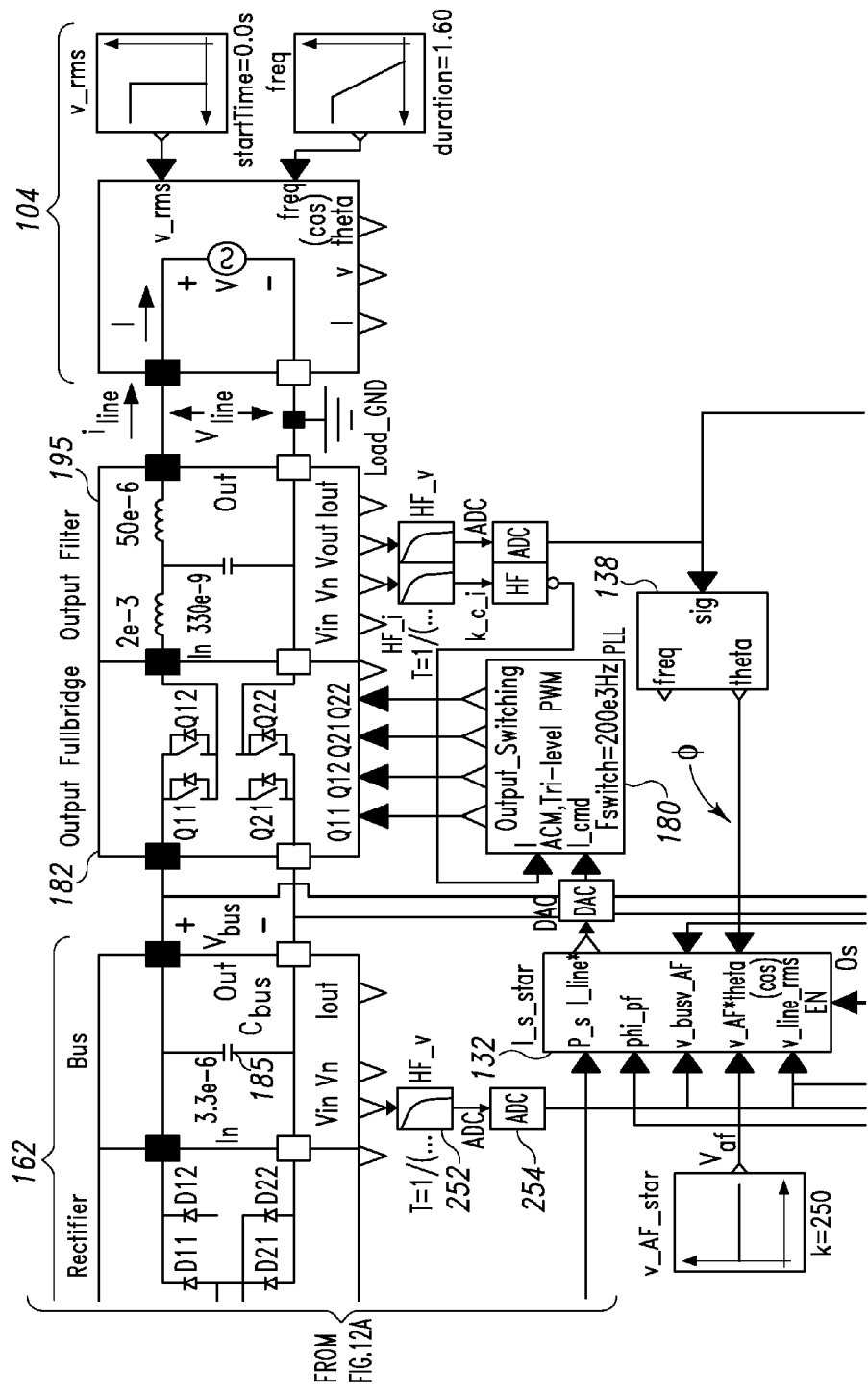
Figure 12D:
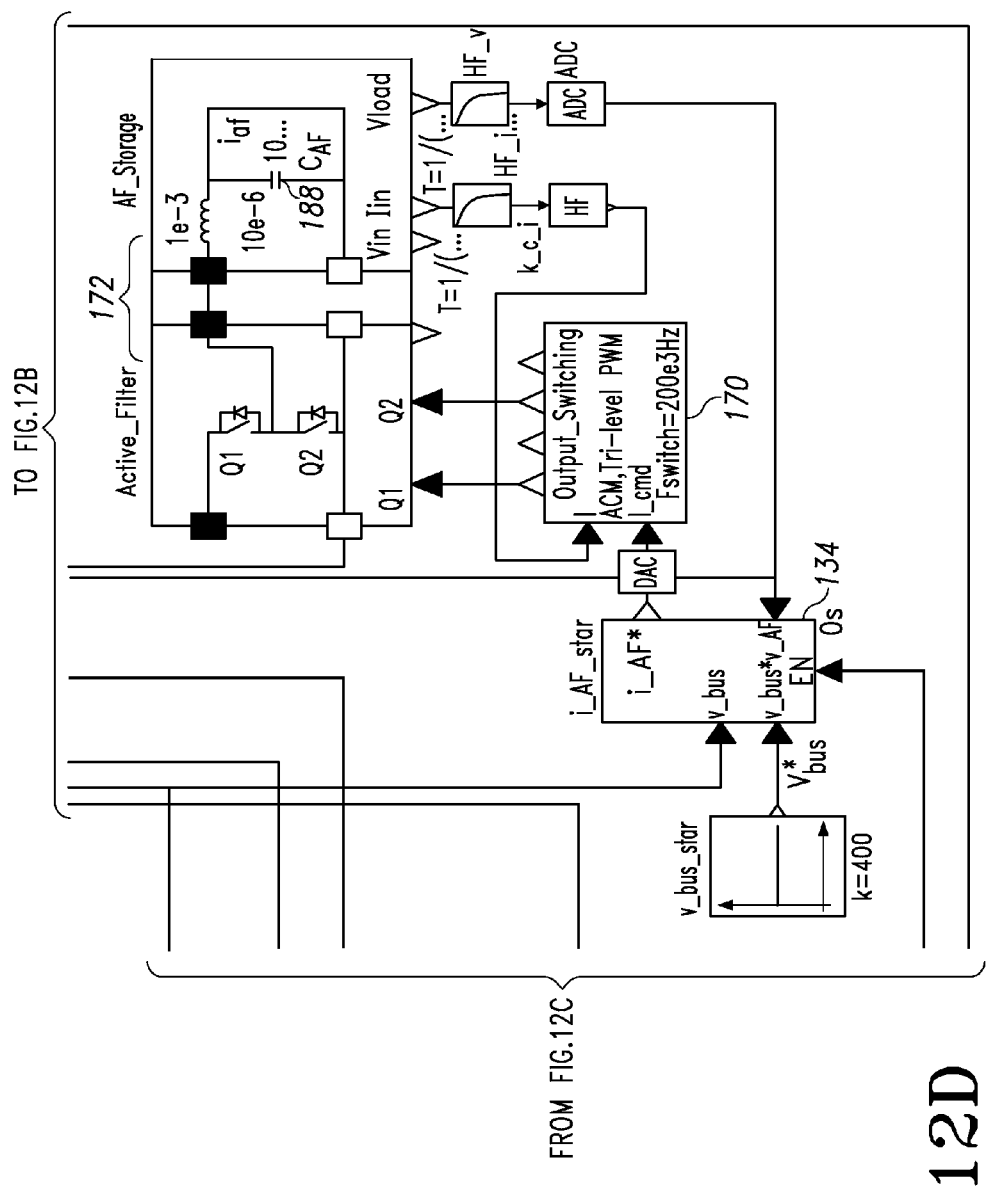

FIG. 12 shows a simulation model of an inverter 300 according to the present disclosure. The unipolar input source 102 is a simulated solar cell. Isolated boost input converter 162, of the type shown in FIG. 2 (with the addition of a 4.7 µF input filter capacitor $C_{IN}$ 250, FIG. 12), is controlled by input converter gating generator 160 and input current controller 130, also of the types previously described. Input converter 162 operates at a switching frequency of 50 kHz and comprises a 3.3 µF filter capacitor $C_{bus}$ 187. Referring to FIGS. 2, 5 and 12, input gating generator 160 comprises a single-pole LPF with a time constant of 3.18 microseconds, a PI controller with $K_P$=0.3 and $K_i$=10,000, and limits on ds set for 0% and 98%; parameters for the input current controller 130 are those described previously with respect to FIG. 5. Full-bridge output converter 162, of the kind shown in FIG. 3, and output filter 195, supply AC current $i_{line}$ at voltage $V_{line}$=240 volts RMS to the AC grid 104 at a grid frequency of 60 Hz. Output converter 162 is controlled by output converter gating generator 180 and output current controller 132, also of the types previously described, and operates at a switching frequency of 50 kHz. Referring to FIGS. 3, 6 and 12, output gating generator 180 comprises a single-pole LPF with a time constant of 6.63 microseconds, a PI controller with $K_P$=0.6 and $K_i$=25,000, and limits on ds set for 0% and 98%; parameters for the output current controller 132 are those described previously with respect to FIG. 6 and $\epsilon_{1OC}$=0.005, $\epsilon_{2OC}$=0.25 and $\omega_{0OC}$=760.26. Half-bridge active filter 172, of the kind shown in FIG. 3, comprises 10 µF active filter capacitor $C_{AF}$, operates at a switching frequency of 200 kHz and is controlled by active filter gating generator 170 and active filter current controller 134, of the types previously described. Referring to FIGS. 3, 7 and 12, active filter gating generator 170 comprises a single-pole LPF with a time constant of 6.63 microseconds, a PI controller with $K_P$=0.6 and $K_i$=25,000, and limits on ds set for 0% and 98%; parameters for the active filter controller 134 are those described previously with respect to FIG. 7. PLL 139 provides phase information, θ, synchronized to the phase of the AC grid 104. The simulation model comprises commanded power factor angle $\phi_{pf}$=0; commanded average active filter capacitor voltage $V_{AF}^*$=250V; and commanded unipolar bus voltage $V_{bus}$=400 V. Blocks labeled "HF" in FIG. 12 represent hardware filters for filtering switching noise and other relatively high-frequency artifacts from measured signals; blocks marked ADC represent analog-to-digital converters; blocks marked DAC represent digital-to-analog converters. ADC blocks convert analog signal levels to digital format for use by logical controller blocks; DAC blocks take calculated values of variables in digital format from logical controller blocks and convert them to analog values. ADC blocks and DAC blocks are 8-bit or higher in digital resolution. It is understood that in some embodiments supervisory controllers 130, 132, 134, and other control blocks, may be implemented in logic, such as by use of a digital signal processor ("DSP"), and that filters and PI controllers may be implemented in processor code using, e.g., the Tustin transformation and/or other known conversion methods.

Figure 13A:
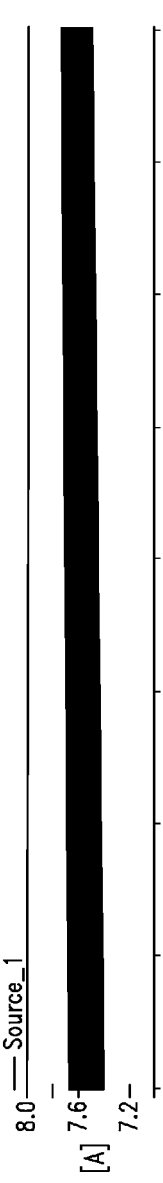
FIGS. 13A through 13D and 14 illustrate, respectively, simulation waveforms and power flows for the inverter system of FIG. 12.
Figure 13B:
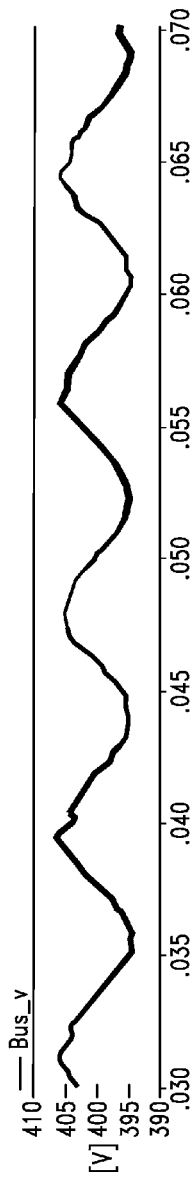
Figure 13C:
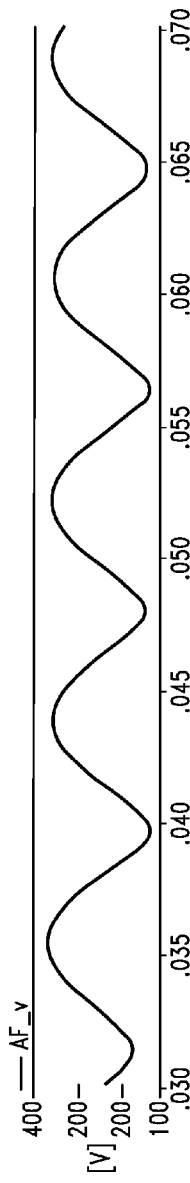
Figure 13D:
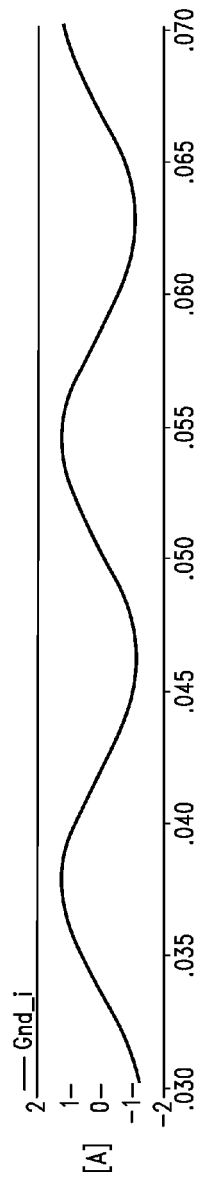

Operating waveforms and power flows for the inverter of FIG. 12 are shown in Figures and 14 for a solar cell 102 irradiance level of 1000 W/m² and with the solar cell delivering 210 Watts at a MPP corresponding to $I_{SC}$=$I_{MPP}$=7.9 A and $V_{SC}$=$V_{MPP}$=26.6V. The waveforms in FIG. 13 are for a converter that is converging on, but that has not quite reached, steady-state operation (i.e. FIG. 13A shows the current $I_{SC}$ delivered by the solar cell (the peak-to-peak ripple is switching noise at 50 kHz); FIG. 13B shows the unipolar bus voltage, $V_{bus}$; FIG. 13C shows the active filter capacitor voltage, $v_{af}$; and FIG. 13D shows the sinusoidal current $i_{line}$ delivered to the AC grid 104. Waveforms are smooth; the input current exhibits no visible double-frequency ripple; the active filter capacitor voltage is free of sharp discontinuities and the output current is low in distortion. The peak ripple on the unipolar bus is approximately +/−1.3% of the DC value of 400v.

Figure 14:
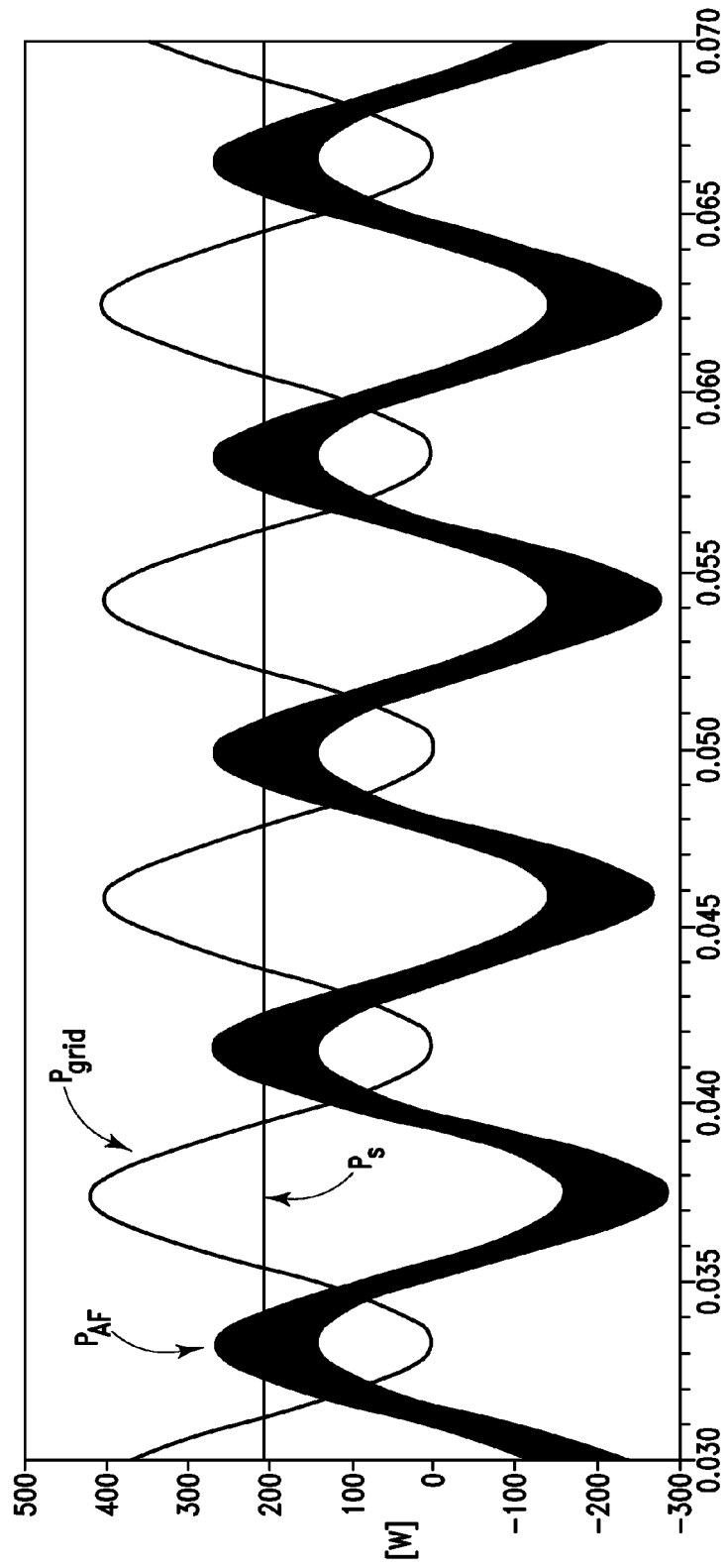

FIG. 14 shows power delivered from the input converter, Ps; power supplied and absorbed by the active filter, $P_{AF}$; and power delivered to the AC grid, $P_{grid}$. The input power, Ps, exhibits no visible double-frequency power ripple and both the active filter power, $P_{AF}$, and the grid power, $P_{grid}$, are smoothly varying and essentially sinusoidal at twice the grid frequency.

Figure 16:
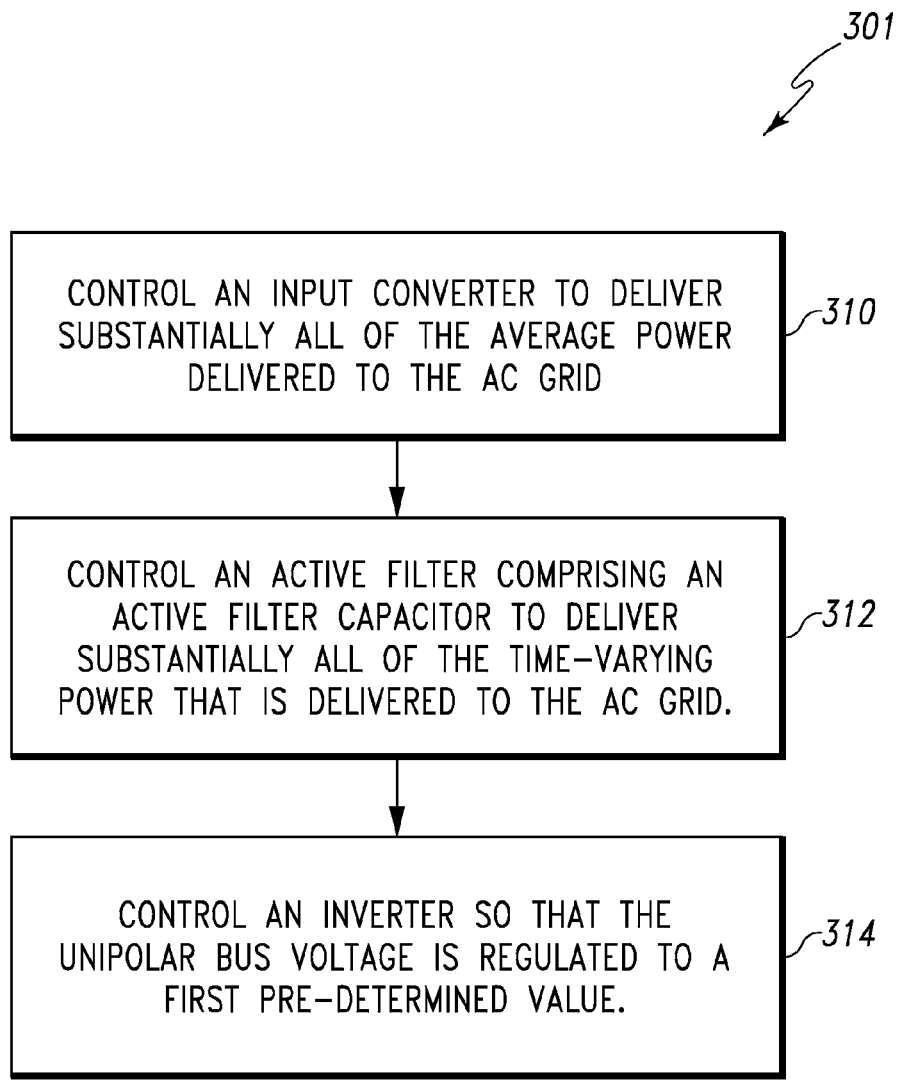
FIG. 16 illustrates one embodiment of a method for controlling an inverter according to the present disclosure.

FIG. 16 shows a flow diagram illustrating a method 301 of controlling an inverter of the kind that delivers power from a unipolar input source to an AC grid, and that comprises an input converter for delivering a pre-determined amount of power from the unipolar input source to a unipolar bus that is galvanically isolated from the unipolar input source; an active filter comprising an active filter capacitor for supplying energy to and absorbing energy from the unipolar bus; an output converter for delivering power from the unipolar bus to the AC grid; and an inverter controller to control the operation of the input converter, the active filter and the output converter. As previously discussed, the input converter, the active filter and the output converter may, respectively, comprise a switching power converter, and the inverter controller may comprise an input converter controller for controlling the current delivered by the input converter, an active filter controller for controlling the time-varying power delivered by the active filter and an output converter controller for controlling the power delivered by the output converter to the AC grid.

As shown in FIG. 16, the method 301 may comprise the following elements: as shown in block 310, the input converter may be controlled to deliver substantially all of the average power delivered to the AC grid; as shown in block 312, the active filter, comprising an active filter capacitor, may be controlled to deliver substantially all of the time-varying power that is delivered to the AC grid; and, as shown in block 314, the inverter may be controlled so that the unipolar bus voltage is regulated to a first pre-determined value.

Figure 17:
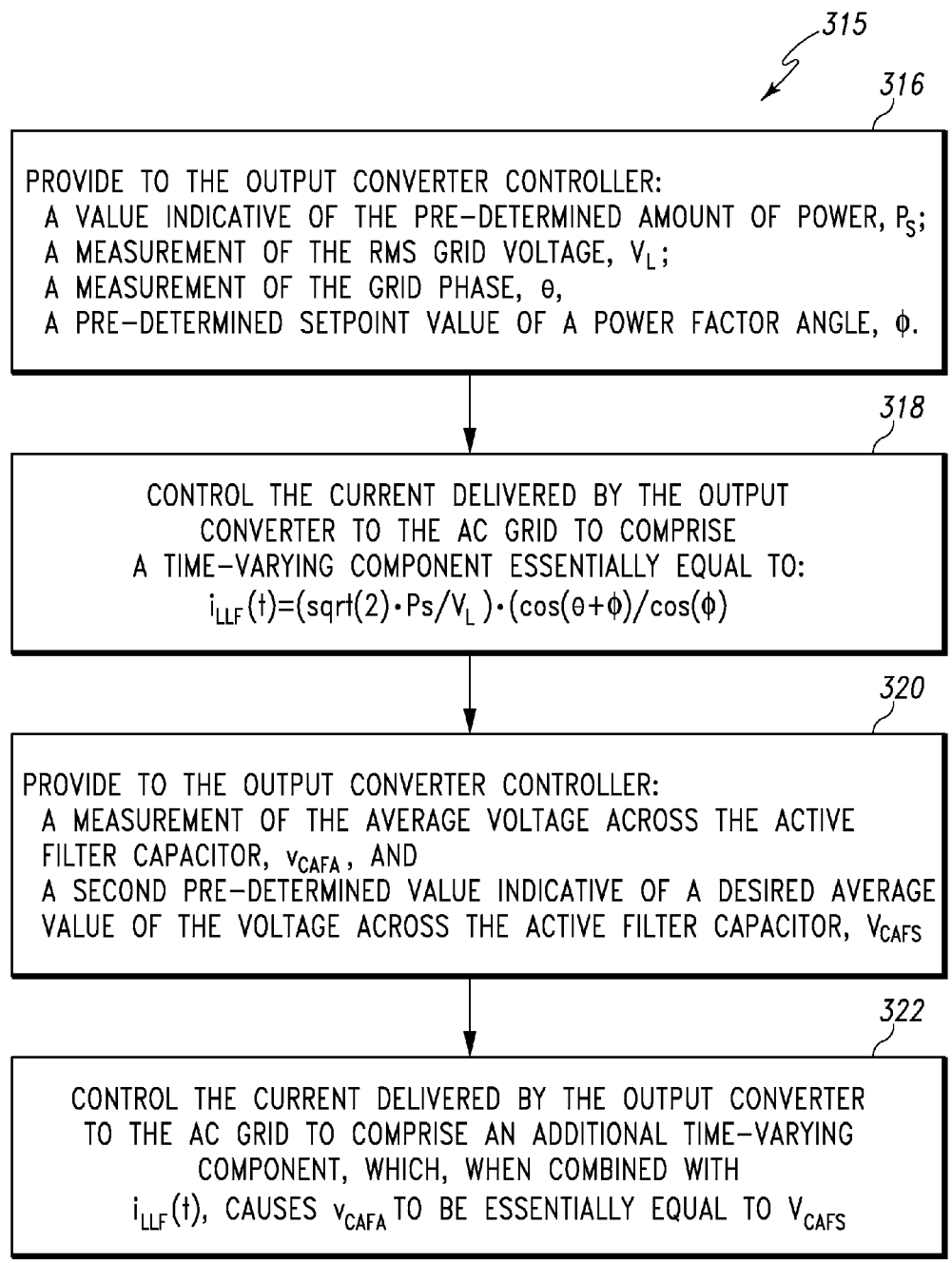
FIG. 17 illustrates one embodiment of a method for controlling an output converter according to the present disclosure.

The method of FIG. 16 may also comprise a method for controlling an output converter 315 as illustrated in FIG. 17. The method 315 may comprise, as shown in blocks 316 and 318 in FIG. 17, providing to the output converter controller a value indicative of the pre-determined amount of power, $P_S$; a measurement of the rms grid voltage, $V_L$; a measurement of the grid phase, θ; and a pre-determined setpoint value of a power factor angle, φ; and controlling the current delivered by the output converter to the AC grid to comprise a time-varying component essentially equal to $i_{LFF}(t)=(sqrt(2) \cdot P_S/V_L) \cdot (cos(\theta+\phi)/cos(\phi))$. As shown in blocks 320 and 322 in FIG. 17, the method of controlling the output converter 315 may also comprise providing to the output converter controller a measurement of the average voltage across the active filter capacitor, $v_{CAF4}$, and a second pre-determined value indicative of a desired average value of the voltage across the active filter capacitor, $V_{CAFS}$, and controlling the current delivered by the output converter to the AC grid to comprise an additional time-varying component, which, when combined with $i_{LFF}$ (t), causes $V_{CAF4}$ to be essentially equal to $V_{CAFS}$.

Figure 18:
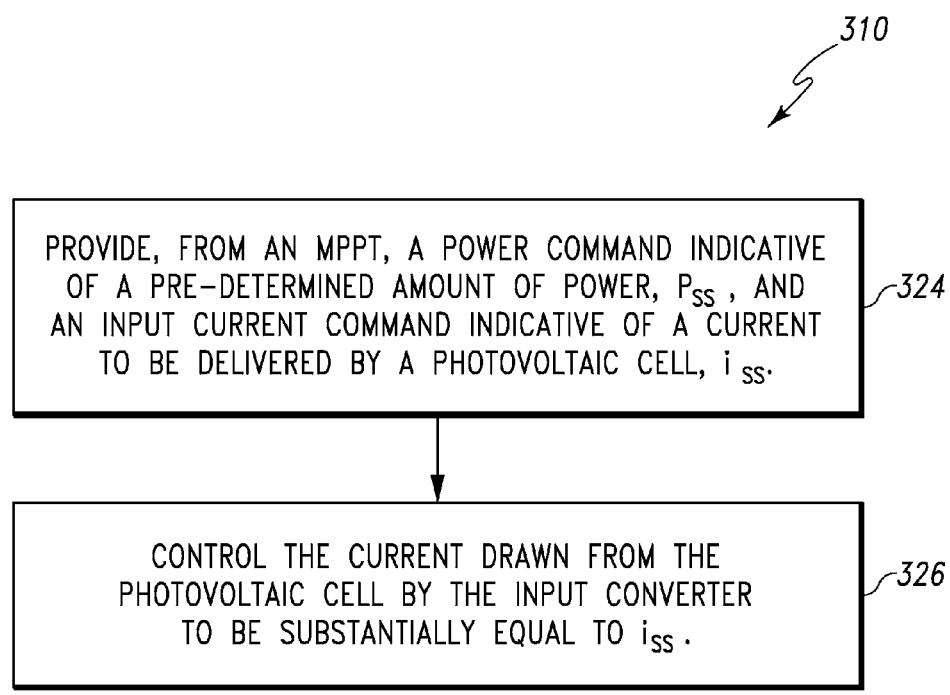
FIG. 18 illustrates one embodiment of a method for controlling an input converter according to the present disclosure.

In an inverter in which the unipolar input source comprises a photovoltaic cell and the input converter controller comprises a maximum-power-point-tracking ("MPPT") controller for determining the pre-determined amount of power, the step of controlling the input converter (block 310, FIG. 16) may, as illustrated in block 324 of FIG. 18, comprise providing, from the MPPT, a power command indicative of a pre-determined amount of power, $P_{SS}$, and an input current command indicative of the current, $i_{SS}$, to be delivered by the photovoltaic cell current, $i_{SS}$. The method may further comprise, as illustrated in block 326 of FIG. 18, controlling the current drawn from the photovoltaic cell by the input converter to be substantially equal to $i_{SS}$.

Figure 19:
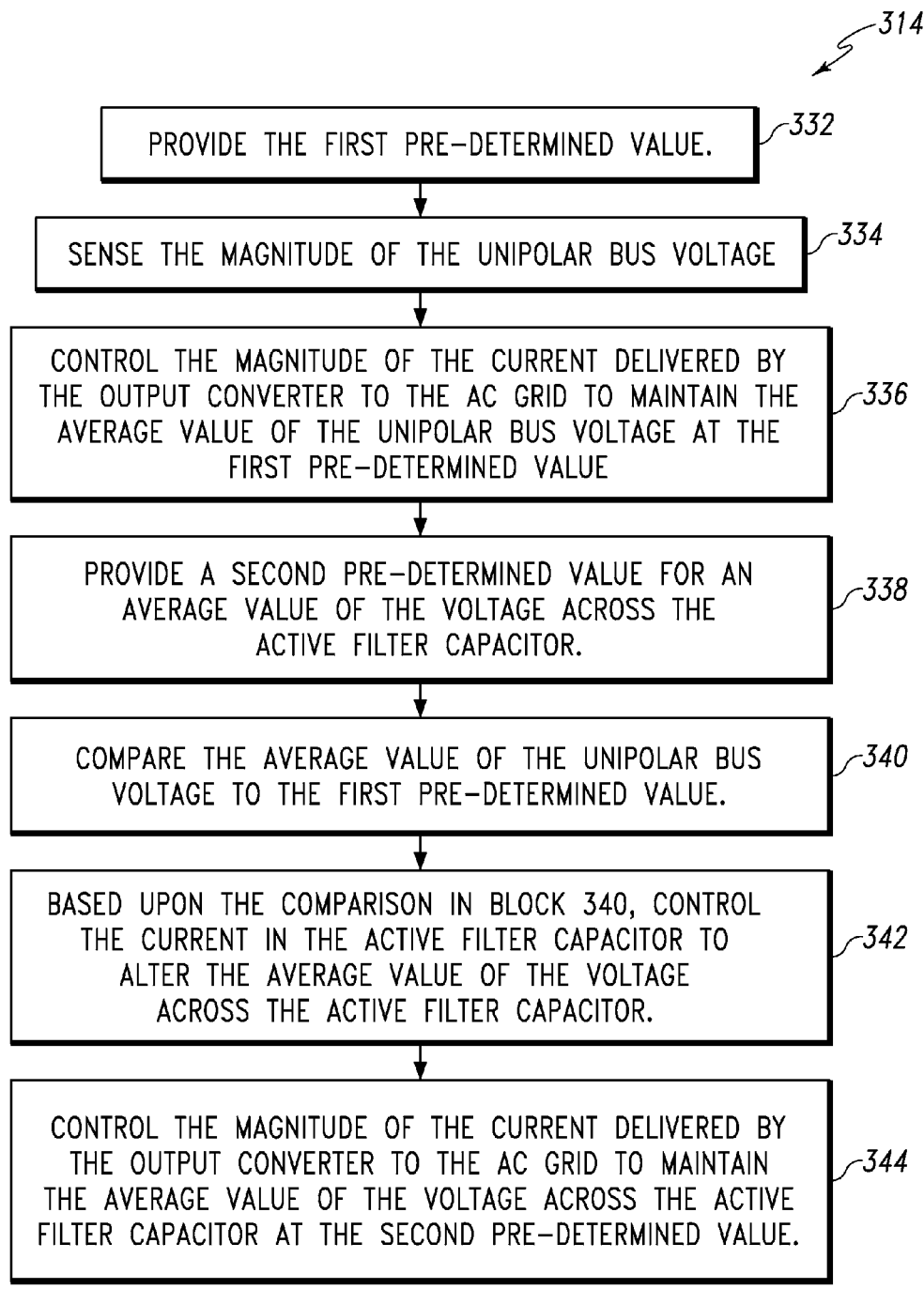
FIG. 19 illustrated one embodiment of a method for regulating a unipolar bus voltage of an inverter according to the present disclosure.

As shown in blocks 332, 334 and 336 in FIG. 19, a method for regulating the unipolar bus voltage (block 314, FIG. 16) may comprise providing the first pre-determined value; sensing the magnitude of the unipolar bus voltage; and controlling the magnitude of the current delivered by the output converter to the AC grid to maintain the average value of the unipolar bus voltage at the first pre-determined value. The method may further comprise, as shown in blocks 338, 340 342 and 344, providing a second pre-determined value for an average value of the voltage across the active filter capacitor; comparing the average value of the unipolar bus voltage to the first pre-determined value; based upon the comparison, controlling the current in the active filter capacitor to alter the average value of the voltage across the active filter capacitor; and controlling the magnitude of the current delivered by the output converter to the AC grid to maintain the average value of the voltage across the active filter capacitor at the second pre-determined value.

The inverter, controllers, and methods described herein may be implemented as discrete circuits or in the form of software code and/or logical instructions that are processed by a microprocessor, digital processor, DSP or other means, or any combination thereof. The logical processes may run concurrently or sequentially with respect to each other or with respect to other processes, such as measurement processes and related calculations. Controllers may be implemented in mixed-signal circuitry; in circuitry comprising mixed-signal circuitry comprising a digital processor core; or in circuitry comprising a combination of mixed-signal circuitry and a separate digital signal processor. They may be implemented as an integrated circuit or a hybrid device. There may also be additional logical processes that may not be shown, such as, e.g., safety and protection mechanisms; timing and frequency generation mechanisms; and hardware and processes related to regulatory requirements. Pre-determined values, such as, e.g., the commanded values $V_{bus}^*$ and $V_{AF}$, may be stored in read-only or re-programmable non-volatile memory or other storage media. Communication means may also be incorporated into the inverter as a means of downloading commanded values or other operating information to the inverter and/or for uploading inverter operating information to user equipment.

Certain embodiments of the present disclosure have been described. Nevertheless, it will be understood that various modifications may be made without departing from the spirit and scope of the disclosure. For example, any of a wide variety of known non-resonant and resonant switching power converter topologies may be used in place of the specific converter embodiments described herein. The unipolar input source may be a fuel cell or another kind of DC source. The inverter controller may comprise elements for regulatory and safety monitoring and control (e.g., circuits or processes for disabling the inverter in the event of AC grid fault or input source fault; anti-islanding protection). Switches in power converters (e.g., switches 171-174, FIG. 2) are shown to be MOSFETs and to comprise diodes across their terminals. It is understood that other types of switches may be used (e.g., bipolar transistors, IGBTs) and that diodes may be intrinsic to the semiconductor switch or may be discrete devices. Switches may also be provided with passive or active snubbers to prevent losses and/or to limit voltage or current stresses.

There is a plurality of advantages of the present disclosure arising from the various features of the apparatuses, circuits, and methods described herein. It will be noted that alternative embodiments of the apparatuses, circuits, and methods of the present disclosure may not include all of the features described yet still benefit from at least some of the advantages of such features. Those of ordinary skill in the art may readily devise their own implementations of the apparatuses, circuits, and methods that incorporate one or more of the features of the present disclosure and fall within the spirit and scope of the present invention as defined by the appended claims.

The invention claimed is:

1. An apparatus for controlling the delivery of power from a unipolar input source to an alternating-current (AC) grid at a grid voltage and grid frequency, the apparatus comprising:
    an inverter comprising:
        an input converter configured to deliver power from the unipolar input source to a galvanically isolated unipolar bus;
        an active filter configured to supply energy to and absorb energy from the unipolar bus; and
        an output converter configured to deliver power from the unipolar bus to the AC grid, and
    an inverter controller configured to maintain a voltage of the unipolar bus at a pre-determined value, the inverter controller comprising:
        an input converter controller to control a current delivered by the input converter to the unipolar bus;
        an output converter controller to control the output converter to deliver power to the AC grid; and
        an active filter controller to control the active filter to supply time-varying power to the output converter.

2. The apparatus of claim 1, wherein the active filter controller controls the active filter to supply substantially all of the time-varying power that is delivered to the output converter at the grid frequency and harmonics of the grid frequency.

3. The apparatus of claim 1, wherein the average power delivered to the grid by the output converter is controlled by the output converter controller to be substantially equal to the power delivered by the unipolar source less the substantial total of the power losses in the inverter.

4. The apparatus of claim 1, wherein the power delivered to the grid is controlled by the output controller to comprise an average power component and a time-varying component.

5. The apparatus of claim 4, wherein the active filter controller controls the active filter to deliver substantially all of the time-varying power.

6. The apparatus of claim 5, wherein the active filter is configured as a switching power converter comprising an active filter capacitor and the active filter controller controls the time-varying component by controlling all of the time-varying current that flows in the active filter capacitor.

7. The apparatus of claim 4, wherein the time-varying component comprises a component at twice the grid frequency.

8. The apparatus of claim 6, wherein the active filter controller controls the switches so that the current in the active filter capacitor comprises a time-varying component comprising harmonics at multiples of the grid frequency.

9. The apparatus of claim 6, wherein the active filter controller controls the switches so that the voltage across the active filter capacitor is substantially unipolar.

10. The apparatus of claims 6, wherein the active filter controller is configured to receive a measurement of the unipolar bus voltage, $V_{bus}$, and a setpoint value indicative of the said pre-determined value for the unipolar bus voltage, $V_{Sbus}$, and to control the current flowing in the active filter capacitor, $i_{CAF}$, so that the magnitude of a ripple voltage across the unipolar bus, at the grid frequency and harmonics of the grid frequency, is reduced towards zero.

11. The apparatus of claim 10, wherein the active filter controller comprises:
a feedback controller that delivers a feedback control output, $i_{FB}$, that is a function of the difference between $V_{bus}$ and $V_{Sbus}$, and
a scaling element that receives a measurement of the voltage across the active filter capacitor, $v_{CAF}$, and delivers a scaled control output equal to $i_{CAFI} = i_{FB} \cdot (V_{bus}/v_{CAF})$ wherein $i_{CAFI}$ is indicative of a time-varying magnitude of the current that is controlled to flow in the active filter capacitor.

12. The apparatus of claim 11, wherein the active filter controller comprises a voltage limiter configured to deliver to the active filter a setpoint, $i_{SCAF}$, for the current that flows in the active filter capacitor, in accordance with the following logic:
i.) if the voltage $v_{CAF}$ is less than a pre-determined upper voltage limit and greater than a pre-determined lower voltage limit, $i_{SCAF}$ is set equal to $i_{CAFI}$;
ii) if the voltage $v_{CAF}$ is less than the pre-determined lower voltage limit, $i_{SCAF}$ is forced to be of a polarity that causes $v_{CAF}$ to increase above the pre-determined lower voltage limit; and
iii) if the voltage $v_{CAF}$ is greater than the pre-determined upper voltage limit, $i_{SCAF}$ is forced to be of a polarity that causes $v_{CAF}$ to decrease below the pre-determined upper voltage limit.

13. A method for controlling an inverter that is configured to deliver power from a unipolar input source to an alternating-current ("AC") grid at a grid voltage and grid phase, comprising:
delivering a pre-determined amount of power from the unipolar input source to a unipolar bus that is galvanically isolated from the unipolar input source using an input converter;
supplying energy to and absorbing energy from the unipolar bus using an active filter comprising an active filter capacitor;
delivering power from the unipolar bus to the AC grid using an output converter; and
controlling the operation of the inverter using an inverter controller, wherein controlling the operation of the inverter comprises (i) controlling the operation of the input converter to deliver substantially all the average power delivered to the AC grid, (ii) controlling the active filter to deliver substantially all the time-varying power that is delivered to the AC grid, and (iii) regulating the unipolar bus voltage to a first pre-determined value.

14. The method of claim 13, wherein:
delivering the predetermined amount of power comprises delivering the predetermined amount of power from the unipolar input source to the unipolar bus using an input converter comprising a switching power converter, and
controlling the operation of the input converter comprises controlling the input converter using an input converter controller of the inverter controller to deliver the said substantially all the average power delivered to the AC grid.

15. The method of claim 13, wherein:
supplying energy to and absorbing energy from the unipolar bus comprises supplying energy to and absorbing energy from the unipolar bus using an active filter comprising a switching power converter, and
controlling the operation of the active filter comprises controlling the active filter using an active filter controller of the inverter controller to deliver the said substantially all of the time-varying power that is delivered to the AC grid.

16. The method of claim 13, wherein:
delivering power from the unipolar bus to the AC grid comprises delivering power from the unipolar bus to the AC grid using an output converter comprising a switching power converter, and
controlling the operation of the output converter comprises controlling the output converter using an output converter controller of the inverter controller to deliver power to the AC grid.

17. The method of claim 13, wherein controlling operation of the active filter comprises:
sensing the magnitude of the unipolar bus voltage, and
controlling the current in the active filter to reduce the ripple across the unipolar bus towards zero.

18. The method of claim 13, wherein regulating the unipolar bus voltage comprises:
sensing the magnitude of the unipolar bus voltage, and
controlling the magnitude of the current delivered by the output converter to the AC grid to maintain the average value of the unipolar bus voltage at the first pre-determined value.

19. The method of claim 18, further comprising;
providing a second pre-determined value for an average value of the voltage across the active filter capacitor,
comparing the average value of the unipolar bus voltage to the first pre-determined value, and, based upon the comparison, controlling the current in the active filter capacitor to alter the average value of the voltage across the active filter capacitor, and
controlling the magnitude of the current delivered by the output converter to the AC grid to maintain the average value of the voltage across the active filter capacitor at the second pre-determined value.

20. A method for improving efficiency in an inverter that is configured to deliver power from a unipolar input source to an alternating-current ("AC") grid at a grid voltage and grid phase and that operates in accordance with the method of claim 13, the method comprising:
connecting the active filter directly to the unipolar bus.

* * * * *